(12) United States Patent
Islam et al.

(10) Patent No.: US 9,742,688 B2
(45) Date of Patent: Aug. 22, 2017

(54) SYSTEM AND METHOD FOR SUPPORTING SERVICE RESOURCES AND FEATURE SETS IN A CLOUD PLATFORM ENVIRONMENT

(71) Applicant: ORACLE INTERNATIONAL CORPORATION, Redwood Shores, CA (US)

(72) Inventors: Nazrul Islam, Santa Clara, CA (US); Kshitiz Saxena, Bangalore (IN); Rajiv Mordani, Sunnyvale, CA (US); Jagadish Ramu, Bangalore (IN); Sivakumar Thyagarajan, Bangalore (IN); Jeffrey West, Los Angeles, CA (US); Sandhya Kripalani, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 268 days.

(21) Appl. No.: 14/495,822

(22) Filed: Sep. 24, 2014

(65) Prior Publication Data
US 2015/0120939 A1 Apr. 30, 2015

Related U.S. Application Data

(60) Provisional application No. 61/897,708, filed on Oct. 30, 2013.

(51) Int. Cl.
*H04L 12/24* (2006.01)
*H04L 12/911* (2013.01)

(52) U.S. Cl.
CPC .......... *H04L 47/70* (2013.01); *H04L 41/5045* (2013.01); *H04L 41/5051* (2013.01); *H04L 41/5096* (2013.01)

(58) Field of Classification Search
CPC . H04L 47/70; H04L 41/5096; H04L 41/5051; H04L 41/5045
See application file for complete search history.

(56) References Cited

U.S. PATENT DOCUMENTS

2004/0177335 A1* 9/2004 Beisiegel ............... G06Q 10/10
717/102
2012/0324069 A1* 12/2012 Nori .................... H04L 41/0806
709/222

(Continued)

OTHER PUBLICATIONS

VMware, Sep. 22, 2013. "OVF Tool User's Guide—VMware OVF Tool 3.5.0" Retrieved on Sep. 1, 2016 from <https://www.vmware.com/support/developer/ovf/ovf350/ovftool-350-userguide.pdf>.*

(Continued)

*Primary Examiner* — Dustin Nguyen
*Assistant Examiner* — Juan C Turriate Gastulo
(74) *Attorney, Agent, or Firm* — Tucker Ellis LLP

(57) ABSTRACT

In accordance with an embodiment, described herein is a system and method for providing service resources for consumption by an application deployed to a service in a cloud environment. A service definition package (SDP) for the service can specify a dependency on a provider, and include association rules that define actions to be taken with regard to a runtime of the provider. When the service is provisioned, a service resource type which is derived from a provider SDP can be associated with the service. As a result of the association, a service resource can be automatically created from the service resource type in accordance with the association rules, to provide resources for consumption by the application. In accordance with an embodiment, the provider SDP can include a plurality of feature sets associated with different sets of configurable properties, which allows different provider types or service resource types to be created.

18 Claims, 15 Drawing Sheets

(56) References Cited

U.S. PATENT DOCUMENTS

2013/0219388 A1* 8/2013 Moeller .............. G06F 9/45558
718/1
2015/0120701 A1* 4/2015 Schmidt .............. G06F 17/3089
707/722

OTHER PUBLICATIONS

Rodero-Merino et al; Mar. 6, 2010. "From infrastructure delivery to service management in clouds" Retrieved on Sep. 1, 2016 from <http://www.sciencedirect.com/science/article/pii/S0167739X10000294>.*

Jas, Sep. 24, 2013. "Web Deploy command line (msdeploy.exe) Scenario bash" Retrieved on Sep. 1, 2016 from <http://www.asprangers.com/post/2013/09/24/Web-Deploy-command-line-(msdeployexe)-Scenario-bash.aspx>.*

\* cited by examiner

SYSTEM AND METHOD FOR SUPPORTING SERVICE RESOURCES AND FEATURE SETS IN A CLOUD PLATFORM ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to U.S. Provisional Application titled "SYSTEM AND METHOD FOR SERVICE RESOURCES AND PLUGINS IN A CLOUD PLATFORM ENVIRONMENT", Application No. 61/897,708, filed Oct. 30, 2013, which application is herein incorporated by reference.

FIELD OF INVENTION

Embodiments of the invention are generally related to cloud computing, and in particular to systems and methods for providing service resource access to applications deployed in a service in a cloud platform environment.

BACKGROUND

The term "cloud computing" is generally used to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. Generally, a cloud computing model enables some of those responsibilities which previously may have been provided by an organization's own information technology department, to instead be delivered as service layers within a cloud environment, for use by consumers (either within or external to the organization, according to the cloud's public/private nature).

As an illustrative example, a cloud computing model can be implemented as Platform as a Service (PaaS), in which consumers can use software programming languages and development tools supported by a PaaS provider to develop, deploy, and otherwise control their own applications, while PaaS providers manages or controls other aspects of the cloud environment (i.e., everything below the run-time execution environment). In addition, the PaaS providers can provide support to satisfy a service's infrastructural requirements, e.g., database support for transactional-logs and timer-service.

However, support for applications deployed in a PaaS service often needs to be manually configured by an application deployer, which is time consuming and error prone. These are the general areas that embodiments of the invention are intended to address.

SUMMARY

In accordance with an embodiment, described herein is a system and method for providing service resources for consumption by an application deployed to a service in a cloud environment. A service definition package (SDP) for the service can specify a dependency on a provider, and include association rules that define actions to be taken with regard to a runtime of the provider. When the service is provisioned, a service resource type which is derived from a provider SDP can be associated with the service. As a result of the association, a service resource can be automatically created from the service resource type in accordance with the association rules, to provide resources for consumption by the application. In accordance with an embodiment, the provider SDP can include a plurality of feature sets associated with different sets of configurable properties, which allows different provider types or service resource types to be created.

DETAILED DESCRIPTION

In accordance with an embodiment, a cloud computing environment enables responsibilities which previously may have been provided by an organization's own information technology department, to be delivered as service layers within a cloud environment, for use by consumers that are either internal (i.e., private) or external (i.e., public) to the organization. Described herein are a variety of hardware and/or software components and features, which can be used in delivering an infrastructure, platform, and/or applications to support cloud computing.

Figure 1:
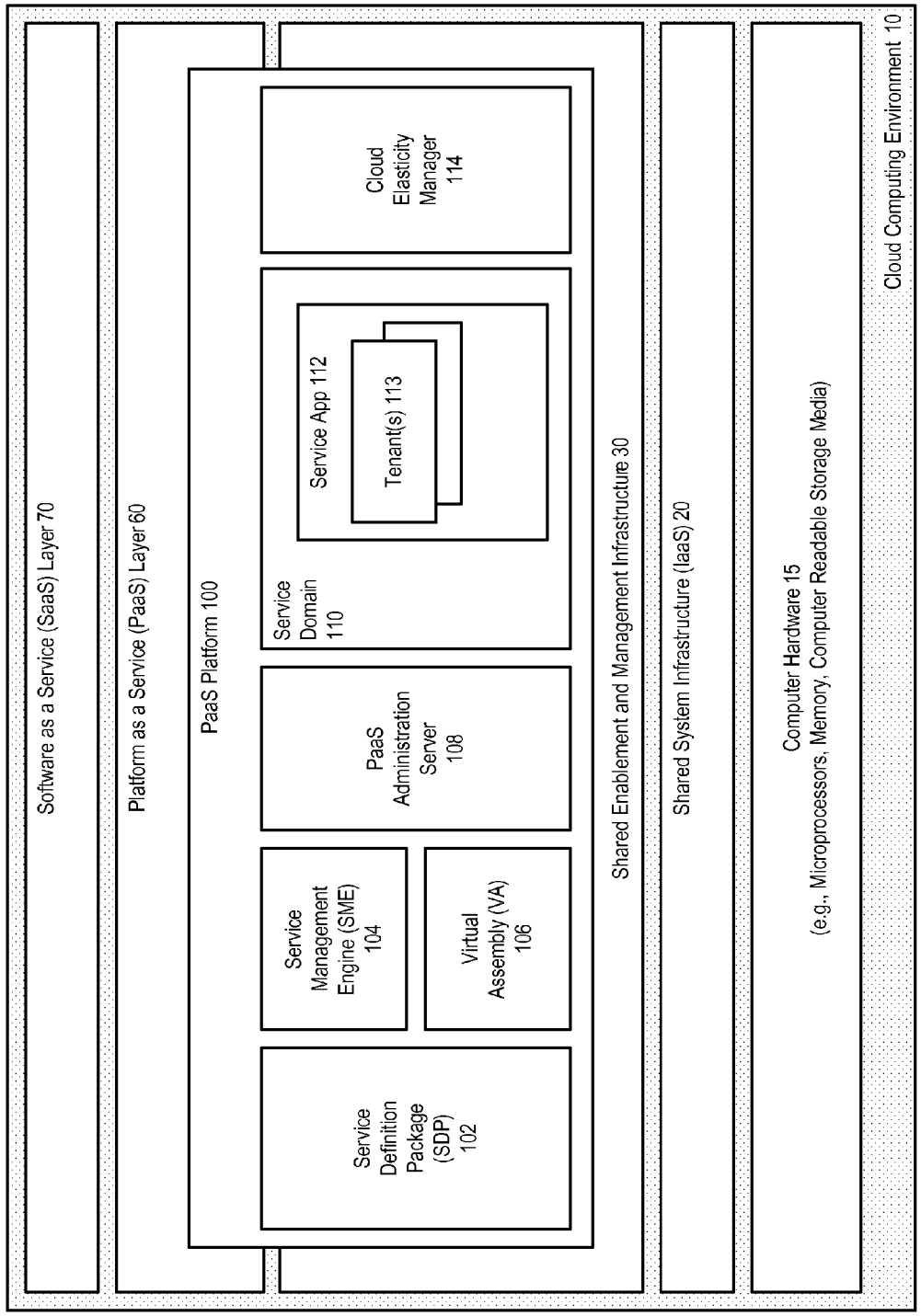
FIG. 1 illustrates an example of a cloud computing environment, in accordance with an embodiment.

FIG. 1 illustrates an example of a cloud computing environment, in accordance with an embodiment. As shown in FIG. 1, a cloud computing environment (referred to herein in some embodiments as a cloud environment, or cloud) 10 can generally include a combination of one or more Infrastructure as a Service (IaaS) 20, Platform as a Service (PaaS) 60, and/or Software as a Service (SaaS) 70 layers, which can be delivered as service layers within the cloud environment. The cloud environment can be implemented as a system that includes a computer hardware 15, such as one or more conventional general purpose or specialized digital computers, computing devices, machines, microprocessors, memory and/or computer readable storage media.

In accordance with an embodiment, each of the IaaS, PaaS, and/or SaaS layers can generally include a variety of components. For example, in accordance with an embodiment, the IaaS layer can include a shared database hardware (e.g., an Exadata machine), and/or shared application server hardware (e.g., an Exalogic machine); while the PaaS layer can include one or more PaaS services, such as a database service, application server service, and/or WebCenter service; and the SaaS layer can include various SaaS services, such as enterprise applications (e.g., Oracle Fusion SaaS), and/or ISV or custom applications. The cloud environment can also include a shared enablement and managing infrastructure 30, which provides enablement and management tools that support the various service layers, for example, identity management, virtual assembly builder, system provisioning, tenant management, or other components.

In accordance with an embodiment, the cloud environment can include a PaaS platform component 100 (referred to herein in some embodiments as a PaaS platform, or CloudLogic), which enables the provisioning of enterprise software applications within the environment. For example, the PaaS platform can be provided as an installable software suite that provides a self-service provisioning experience for enterprise applications such as Fusion Middleware (FMW).

As shown in FIG. 1, in accordance with an embodiment, the PaaS platform can include one or more service definition package (SDP) 102, service management engine (SME) 104, virtual assembly (VA) 106, PaaS administration server 108, service domain 110 including one or more service applications (apps) 112 for use by one or more cloud accounts or tenants 113, and/or elasticity manager 114 components.

The example shown in FIG. 1 is provided as an illustration of an exemplary cloud environment and PaaS platform. In accordance with other embodiments, different and/or other types or arrangements of components can be included.

In accordance with an embodiment, the following terms are used herein.

PaaS Platform Component (PaaS Platform, Platform, CloudLogic): In accordance with an embodiment, a PaaS platform component is an installable software suite that provides a self-service provisioning experience for enterprise applications, such as FMW or other enterprise applications.

Site: In accordance with an embodiment, a site is the entity created and configured by the Platform Administrator from a PaaS platform installation, which tenants and Platform Administrators interact with to perform the various operations in the platform. In accordance with an embodiment, a site can be implemented as a WebLogic domain.

Tenant: In accordance with an embodiment, a tenant (referred to herein in some embodiments as an account) is an entity that is associated with users that consume the platform as a service, and establishes an administrative scope that administrators use to access PaaS services. For example, a tenant can be created for an organization, department, or group. Roles such as Tenant Administrator can be associated with a tenant; and quotas can be assigned to a tenant. A tenant can create one or more environments, and have one or more sub-tenants. Consumed resources, such as services with their virtual machines, databases, DNS entries, load balancer and other configurations, can be associated with a tenant.

Sub-tenant: In accordance with an embodiment, a sub-tenant is an entity that exists under a tenant. A sub-tenant has a quota assigned from the overall tenant's quota. For example, a tenant can have one or more sub-tenants, and the Tenant Administrator can assign a quota from the overall tenant quota to each sub-tenant. A sub-tenant can create one or more environments.

Service Definition Package: In accordance with an embodiment, a service definition package (SDP) is a package that contains the information necessary for a particular type of service to be offered by the PaaS platform. For example, each type of FMW service can provide its own SDP. An SDP can contain custom code that is installed into the cloud platform, and a virtual assembly that contains the topology and configuration of a set of virtual appliances that will comprise a running instance of the service, upon being deployed onto a set of virtual machines (VMs).

Service Management Engine: In accordance with an embodiment, a service management engine (SME) provides a generic means to plug any service type into the system. For example, an SME takes care of the service-specific provisioning, lifecycle, management, and monitoring support for a service type or provider type.

Service Type: In accordance with an embodiment, a service type is a representation of software functionality that can be instantiated within the PaaS platform site for a tenant. A service type is created based on an SDP, with additional configuration information supplied by the Platform Administrator. Some of this configuration information may supply values that are specific to an installation of the PaaS platform product or the enterprise in which it is running; while some configuration information may reflect the Platform Administrator's choices of options supported by the SDP. Multiple service types can be created from a single SDP, by making different configuration choices.

Environment: In accordance with an embodiment, an environment is a collection of services and their associated providers that are managed together as a group. An environment can be created for the purpose of running an application or providing some higher level service. Environments provide the ability to operate on the collection of services as a whole, with operations such as start, stop, backup, and destroy. An environment provides the functions of an association group, and a management group.

Service: In accordance with an embodiment, a service is an instantiation of a service type. An environment can be associated with multiple services; and within a particular tenant there can be one or more environments with multiple services for a single service type. Typically, a service provides both a service administration interface, and an end-user interface. A service can be associated with identity, database, or other service features that are required by the service; and with a service runtime that runs on one or more VMs.

Provider Type: In accordance with an embodiment, a provider type is a special form of service type that supports providers instead of services. Provider types are created by the Platform Administrator in the same way as service types. As with service types, a provider type is created based on an SDP, with additional configuration information supplied by the Platform Administrator. Some of this configuration information may supply values that are specific to this installation of the PaaS platform product or the enterprise in which it is running; while some configuration information may reflect the Platform Administrator's choices of options supported by the SDP. Multiple provider types can be created from a single SDP, by making different configuration choices.

Provider: In accordance with an embodiment, a provider is a specialization of a service. Unlike services, which are created by explicit action of a Tenant Administrator, providers are created on-demand to satisfy the dependencies of services. A provider is an instantiation of a provider type, and represents the use of the resource managed by the provider type by a particular instance of a service type. Services can be associated with multiple providers. When creating a service, an orchestration engine matches the requirements of a service type with the capabilities of the configured provider types, and then requests the service type to create an instance of a service, and the provider types to create instances of the providers for use by this instance of the service. The orchestration engine then associates the service with the providers.

Association Resource: In accordance with an embodiment, an association resource (sometimes referred to as a provider resource) enables a service to keep track of configuration information for a particular association. For example, if a Java Service is associated with two different database providers, it may need to create a connection pool for each database. The association resource enables the Java Service to keep track of which connection pool is associated with which database, so that, if the orchestration engine needs to change one of the associations, the Java Service will know which connection pool to change.

Runtime: In accordance with an embodiment, a runtime is a representation of the installed and operational software that provides the functionality of a service or a provider. Runtimes are managed by the custom code included in an SDP, in some instances using facilities provided by the PaaS platform, such as its virtualization and provisioning support. Runtimes can be layered, with each layer being shared (multi-tenant), or not shared (dedicated). For example, with a Java Service, the runtime layers may include an application server, a Java virtual machine (JVM), a guest operating system (OS), and a host operating system. When unqualified, the expression "service runtime" generally refers to the top-most layer. For example, a multi-tenant service runtime is a runtime that is shared by multiple services; while a dedicated service runtime is a runtime that is not shared among multiple services.

Service Resource Type: In accordance with an embodiment, a service resource type is a special form of service type that supports service resources instead of services. Service resource types are created by the Platform Administrator in the same way as service types. As with service types, a service resource type is created based on an SDP, with additional configuration information supplied by the Platform Administrator. Multiple service resource types can be created from a single SDP, by making different configuration choices.

Service Resource: In accordance with an embodiment, a service resource is a specialization of a service. Unlike services, which are created by explicit action of a Tenant Administrator, and providers which are created on-demand to satisfy the dependencies of services, service resources are associated with services to satisfy the dependencies of artifacts/applications deployed to services. A service resource can be associated, or disassociated, with a service after the service has been created. A service resource dependency of a service is optional and may be configured by the Platform or Tenant Administrator based on the needs of the artifacts/applications that would be deployed to the service. For example, a service may indicate support for multiple kinds of service resource dependencies; and the Platform or Tenant Administrator may associate multiple service resources for a dependency. A service resource is an instantiation of a service resource type, and represents the use of the infrastructure managed by the service resource type, by a particular instance of a service type. A Service can be associated with one or more service resources. The association of a service to a service resource can happen at any time in the lifecycle of the service, once the service and service resource have been created.

Quota: In accordance with an embodiment, a quota provides a mechanism to limit consumption of a resource, by establishing an upper bound on the resource usage. Examples of quota-controlled resources include CPU, disk, and the number of VMs in use. PaaS layer quotas can also be supported, for example the number of services that can be provisioned. Quotas can be assigned to tenants, and a Tenant Administrator can allocate their quota to projects or groups which they manage.

Namespaces: In accordance with an embodiment, the PaaS platform can use a naming hierarchy, such as a Nimbula-style naming hierarchy and multipart naming scheme. There can be reserved namespaces for SDPs, service-types, provider-types, service-resource-types, service-resources, environments, and services. Namespaces can be defined and reserved at the global level, and per tenant.

Platform Administrator/System Administrator (Role): In accordance with an embodiment, a Platform or System Administrator is responsible for installing, configuring, managing, and maintaining the PaaS platform infrastructure and environment, including the resources that are made available to applications running in the environment. The Platform or System Administrator is also responsible for downloading and installing SDPs to support additional service types, setting up or configuring virtualization technology for the platform to use, and installing and configuring providers.

Cloud Account Administrator (Role): In accordance with an embodiment, a Cloud Account Administrator is responsible for the provisioning of new services, management of generic service properties such as their Quality of Service (QoS) settings and their associations, and the locking and termination of services. A Cloud Account Administrator can assign Service Administrators for each service.

Tenant Administrator (Role): In accordance with an embodiment, a Tenant Administrator is responsible for creating sub-tenants and assigning Tenant Administrator to the sub-tenant groups, and for the provisioning of new services, management of generic service properties, and the locking and termination of services. A Tenant Administrator can assign Service Administrators for each service.

Service Administrator (Role): In accordance with an embodiment, a Service Administrator is responsible for administering and managing a specific service after it has been provisioned. A Service Administrator interacts with the service's administration interface to perform administration and management operations.

Service Runtime Administrator (Role): In accordance with an embodiment, a Service Runtime Administrator is responsible for configuring and managing service runtimes.

Application Deployer (Role): In accordance with an embodiment, an Application Deployer deploys an application to the provisioned service, and is responsible for installing, configuring, and running the application. Once the application is running, it can be made available to an End User.

End User (Role): In accordance with an embodiment, an End User is the user of the applications that are deployed to the service. The End User interacts with the user interface provided by the application running in the service. If the service itself provides an interface for users to consume the functionality that it exposes, then the End User can use that service's interface.

Figure 2:
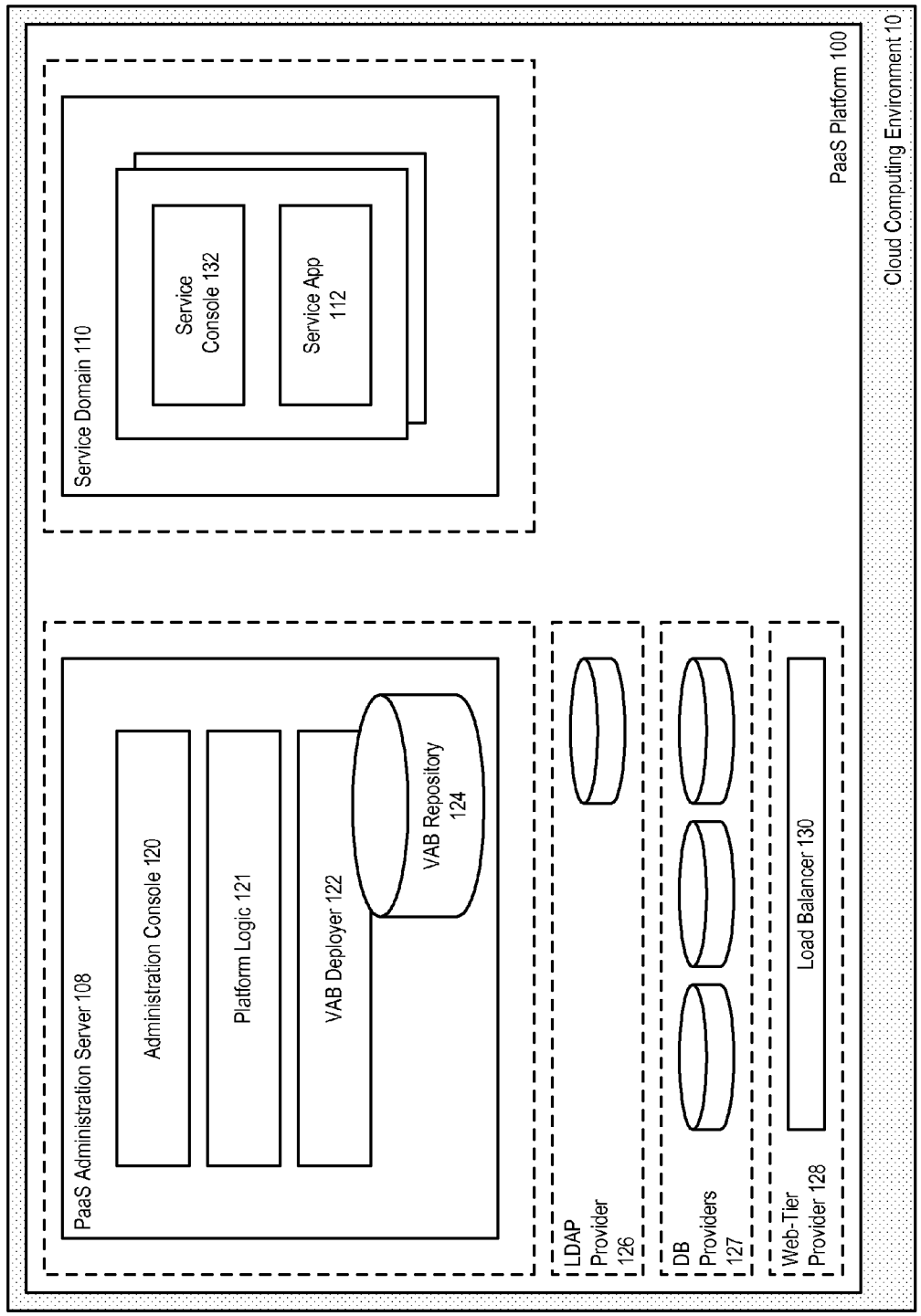
FIG. 2 illustrates a PaaS platform component, including an administration server and a service domain, in accordance with an embodiment.

FIG. 2 illustrates an administration server and a service domain, in accordance with an embodiment. As shown in FIG. 2, in accordance with an embodiment, the PaaS platform (platform) comprises a PaaS administration server 108, which supports an administration console 120, cloud platform provisioning/management logic 121, and virtual assembly builder (VAB) deployer 122, together with a virtual assembly or VAB repository 124. The VAB deployer can be provided by functionality, components, or products such as Oracle Virtual Assembly Builder (OVAB). The VAB deployer (e.g., OVAB Deployer) can then be used by the platform to manage those VMs that will host the servicing applications.

In accordance with an embodiment, the PaaS administration server can be implemented as a WebLogic (WLS) server application, together with, e.g., Glassfish modules embedded therein to provide cloud platform functionality. A service domain, including a service app and service console 132, can be provided for housing enterprise applications, such as FMW applications, that will ultimately service user requests. In accordance with an embodiment, the service domain components may be instantiated multiple times as part of provisioning requests.

In accordance with an embodiment, provider server types that will be used by the PaaS administration server and the service domain, examples of which include LDAP 126, database 127, and Web tier 128 or load-balancer 130 providers, can be provided in pools that are not provisioned by the administration server, but are external services registered with the cloud environment. In accordance with an embodiment, the PaaS platform can make use of a load-balancer provider to forward all incoming, e.g., Web requests, that are directed to the services. For example, each service can be associated with a virtual host name that will be registered with the load-balancer provider during service provisioning.

Figure 3:
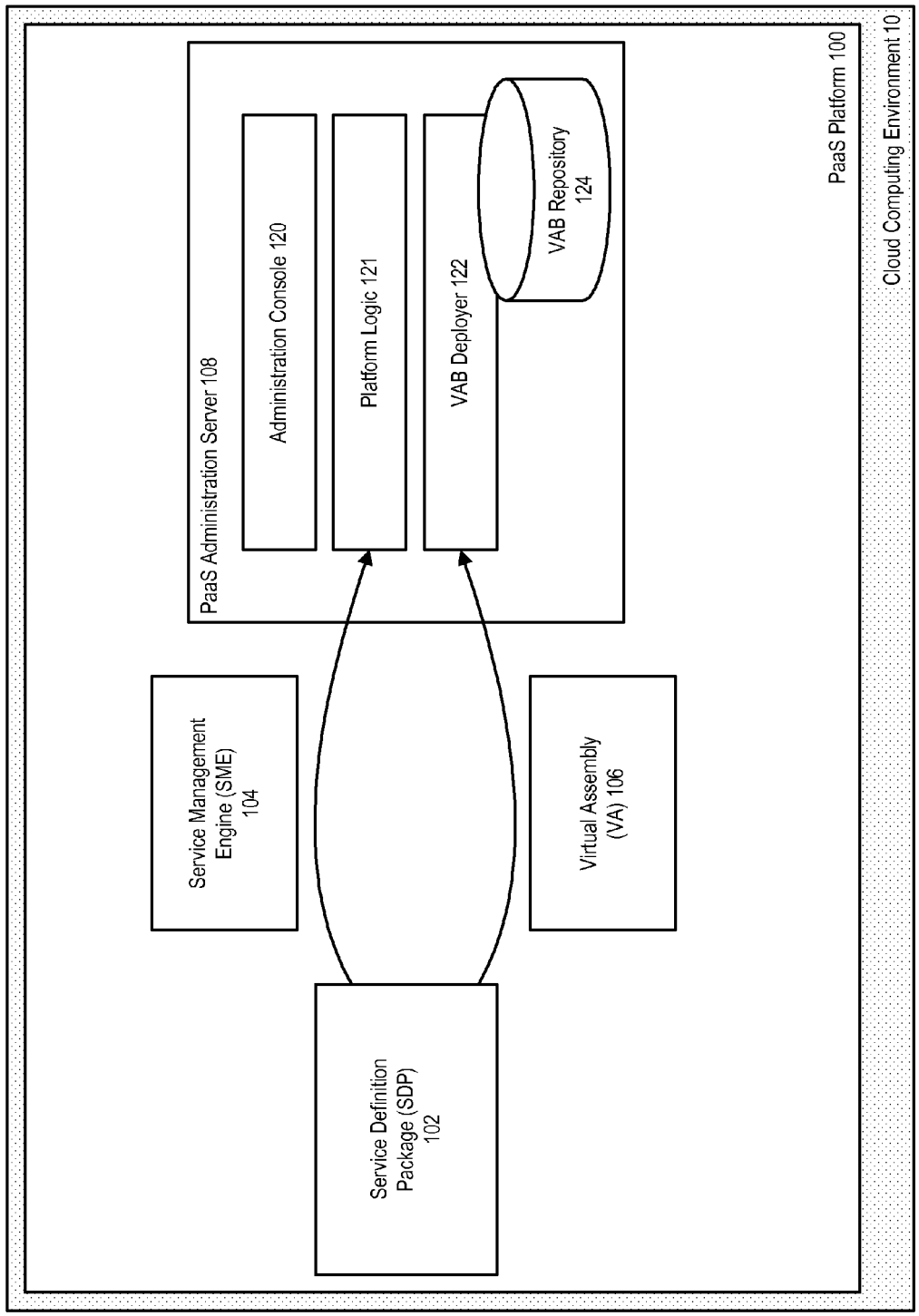
FIG. 3 illustrates the use of service definition packages and service management engines with an administration server, in accordance with an embodiment

FIG. 3 illustrates the use of service definition packages and service management engines with an administration server, in accordance with an embodiment. As shown in FIG. 3, in accordance with an embodiment, new enterprise application service types (e.g., new FMW service types), which the administrator wishes to make available for use within the PaaS platform, can be installed from an SDP. Each SDP contains custom code that can be injected into the platform, for use in supporting, e.g., elasticity and provisioning; together with a virtual assembly (e.g., an OVAB assembly) that contains the topology and configuration of a set of virtual appliances that will comprise a running instance of the enterprise application service, once the assembly is deployed onto a set of VMs.

Figure 4:
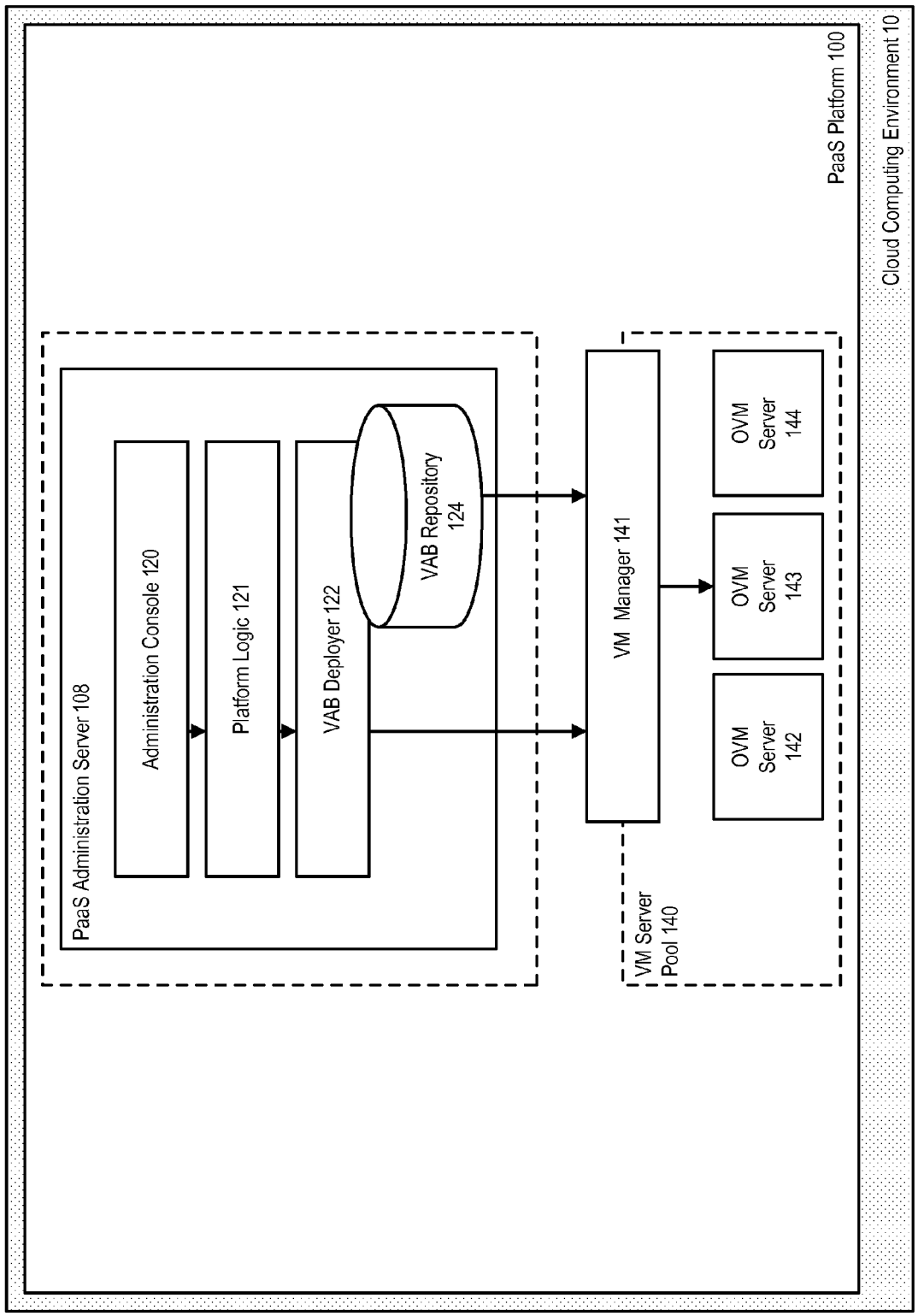
FIG. 4 illustrates the interaction between an administration server and a virtualization manager, in accordance with an embodiment

FIG. 4 illustrates the interaction between an administration server and a virtualization manager, in accordance with an embodiment. As shown in FIG. 4, in accordance with an embodiment, a VM manager component 141 (e.g., Oracle's OVM Manager) can be used by the PaaS platform to manage the pool 140 of VMs 142, 143, 144, which are then used in instantiating a service assembly. When a request is made from a platform module to instantiate an assembly, or a single appliance in the case of a scale-up request, the VAB deployer application (e.g., OVAB Deployer) can interact with the VM manager to fulfill the request. By delegating the infrastructure/virtualization responsibilities to the VM manager and VAB deployer in this manner, the platform can be abstracted from the target deployment platform.

Figure 5:
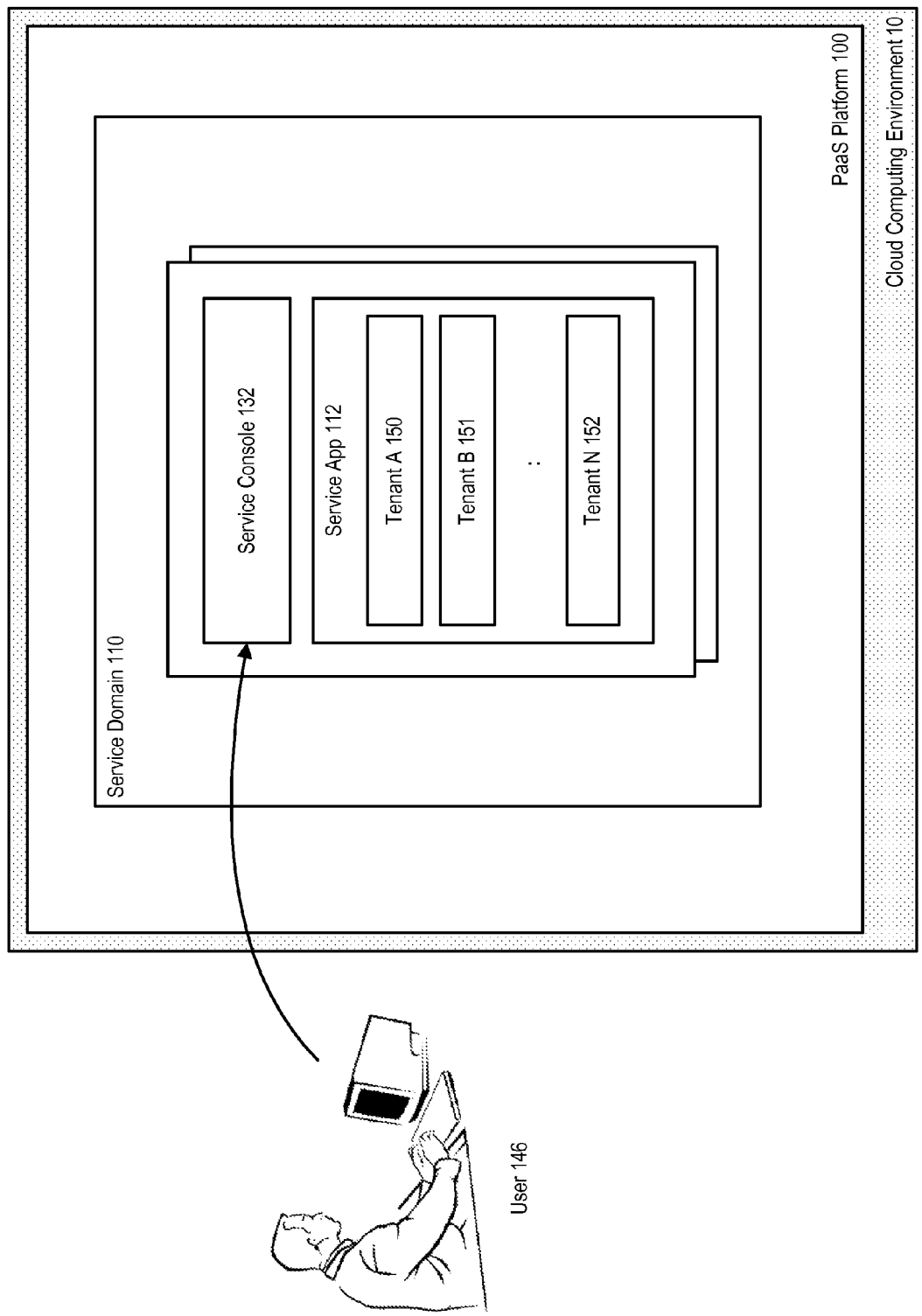
FIG. 5 illustrates a multiple tenant service domain, in accordance with an embodiment.

FIG. 5 illustrates a multiple tenant service domain, in accordance with an embodiment. As shown in FIG. 5, in accordance with an embodiment, a service domain can include multiple tenants 150, 151, 152, that are configurable using the service console. Multi-tenancy, like virtualization, is a density optimization that allows the use of less resources to support more clients and, similar to virtualization, should be transparent to the applications themselves. Although multi-tenancy involves the use of shared resources, the sharing need not be part of the logical model of the applications—these models are instead referred to as using "multitenant" and "dedicated" resources. Alternatively, applications may share resources in a manner that is part of the logical model of the applications; for example, two applications may purposely access a shared database because they intend to operate on the same data—these models are referred to as using "shared" and "unshared" resources.

In accordance with an embodiment, some service types may support both dedicated and multitenant uses, based on their particular configuration. Other service types may support either only dedicated use, or only multitenant use. Service types that are able to support multiple tenants on the same runtime can provision their runtimes in a multitenant manner, during the instantiation process, based on the configuration of the service type. A single instantiated service runtime that has been marked as multitenant-capable will be reused for a finite number of additional service provisioning requests, as determined by the service type and based on its configuration. Generally, it is left to the service application to support a particular tenancy mode; service applications that are not multitenant will only be able to support a single account for each service instance. Once a service has been instantiated from its VM assembly, end users 146 can interact with the system and the instantiated services, in the same manner as they would interact with an on-premise version of that service.

Figure 6:
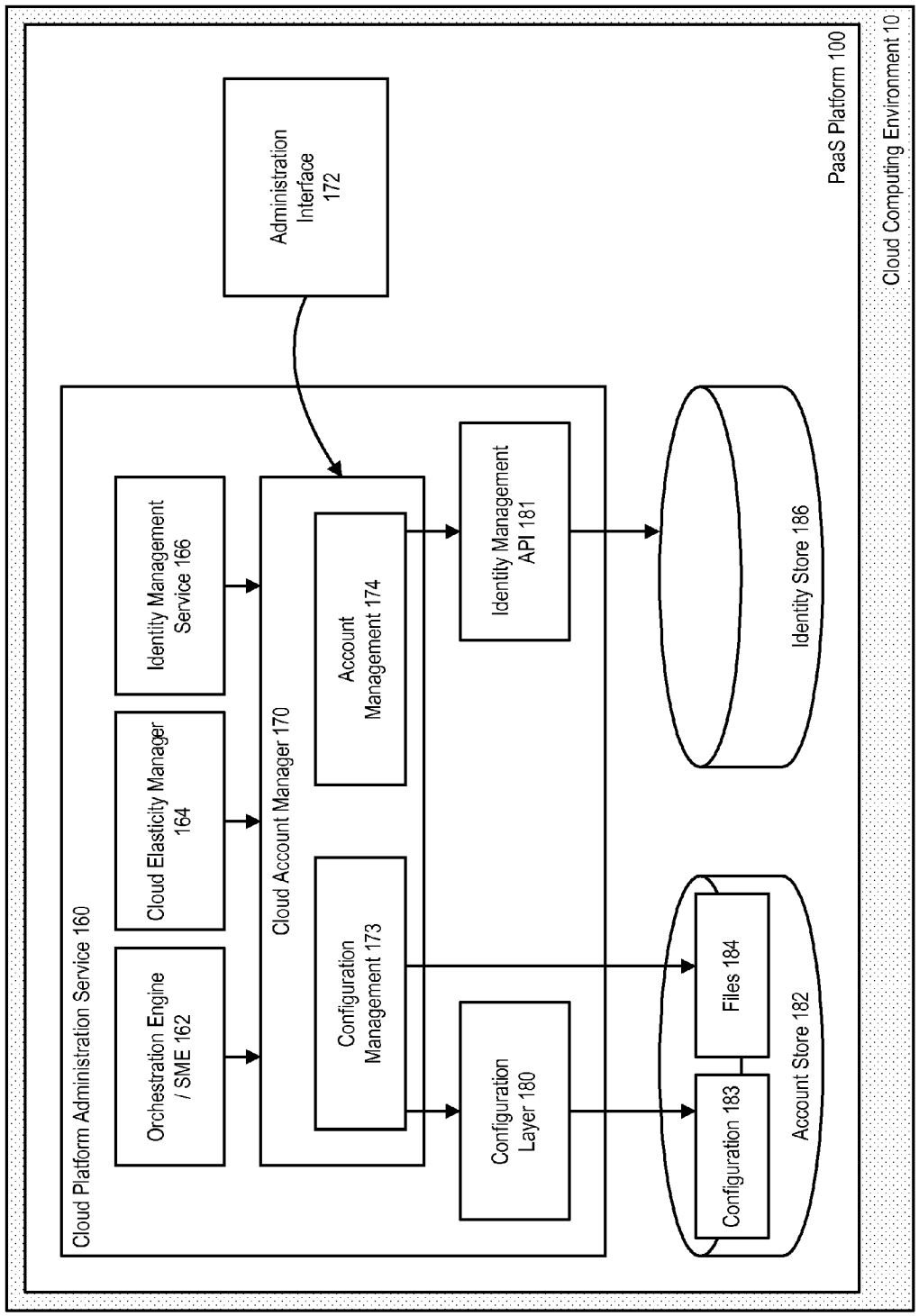
FIG. 6 illustrates a cloud account manager, in accordance with an embodiment

FIG. 6 illustrates a cloud account manager, in accordance with an embodiment. As shown in FIG. 6, in accordance with an embodiment, the PaaS platform can include a cloud platform administration service (CPAS) 160, together with a cloud account manager 170 which supports functions such as account management, and provides a framework that other modules, such as the orchestration engine/SMEs 162, cloud elasticity manager (CEM, referred to herein in some embodiments as an elasticity manager) 164, or identity management service 166), can use to access account-specific data. A configuration management component 173 can use a configuration layer 180 to persist account specific configuration 183 and other files 184 to an account store 182. An account management module 174 provides the ability to manage accounts for a CPAS domain, which can be exposed through the use of a command-line, REST, or other identity management application program interface (API) 181.

In accordance with an embodiment, users can either be managed within an identity store 186 managed by the PaaS platform, or alternatively can be provided from an external, e.g., corporate LDAP, or other means of user identification; and can access the cloud account manager through an administration interface 172. Account and configuration data can also be stored on a file system or other means of storage that is accessible from nodes of a CPAS cluster.

Service Definition Package (SDP)

Figure 7:
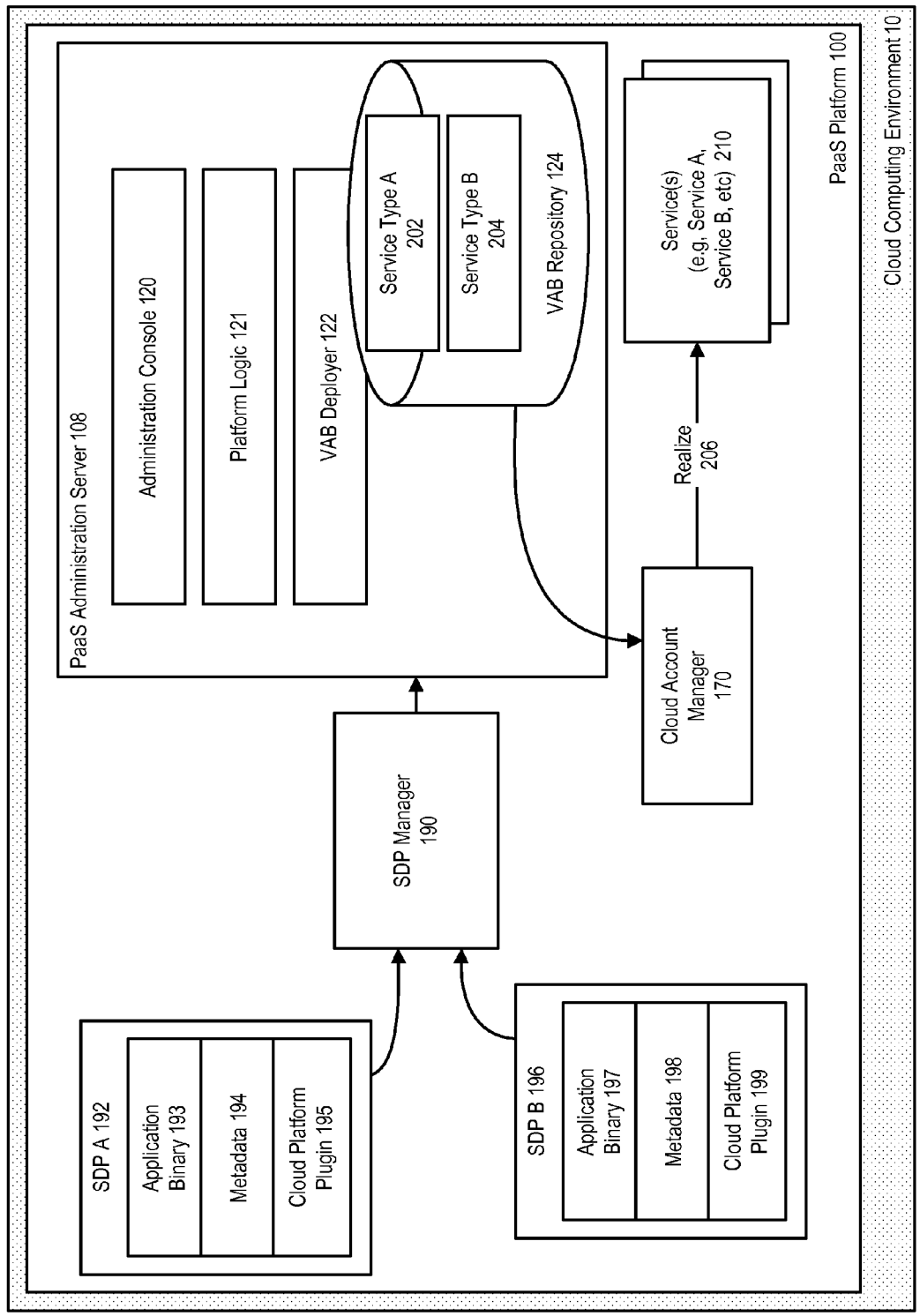
FIG. 7 illustrates the use of a service definition package, in accordance with an embodiment.

FIG. 7 illustrates the use of a service definition package, in accordance with an embodiment. As shown in FIG. 7, in accordance with an embodiment, each SDP 192, 196 can include a binary 193, 197; a metadata 194, 198 (e.g., the SDP name, service type, version, vendor, or virtualization support metadata such as indicating whether the SDP supports OVAB, EC2, or Native); and one or more plugins 195, 199 that enable the SDP to be used within a PaaS platform or cloud environment.

For example, in accordance with an exemplary embodiment, each SDP can include an assembly, reference, package, archive, or template, which can be used to install a service on a particular virtualization provider (e.g., OVAB); an assembly bundled within the SDP or a reference to an assembly (e.g., an EC2-specific reference); a service management engine (SME) plugin for the service type, which enables platform functionality such as elasticity metric gatherers, or alerts to be used with the service; a plugin for use with a VAB deployer (e.g., OVAB Deployer) during its assembly rehydration process; and other dependency and configuration information, such as scalability limits or whether the service is a multitenant or dedicated service.

In accordance with an embodiment, installing an SDP will install, e.g., the OVAB assembly into the OVAB repository; appropriate SME plugins will be registered with the cloud platform; and metric gatherers, alerts and actions will be installed in the PaaS platform. After a System Administrator installs the SDP, a Cloud Account Administrator can then use a cloud account administration interface to request for a service of that type.

In accordance with an embodiment, when an SDP is installed into a PaaS platform domain, it is consumed by an SDP Manager 190, which is responsible for obtaining a list of SDPs available to be installed the local system, downloading an SDP if necessary, installing parts of the SDP into the right places, maintaining a list of those SDPs that have been installed, and, if necessary, uninstalling an SDP by uninstalling all of its parts from the places they were previously installed.

In accordance with an embodiment, the SDP manager can interface with other system components by installing an SME plugin to the CPAS, which can then take responsibility for replicating the SME plugin to other CPAS instances in the cluster, installing the VAB assembly 202, 204 into the VAB deployer, interfacing with other tools such as Enterprise Manager to provide a customized console interface for the service if the service provides one, and installing configuration data for the service into the CPAS. Subsequently, during realization 206 of a service, the service 210 can be realized as an instance of those service types defined by the SDP and installed as assemblies in the VAB repository.

Service Management Engine (SME)

Figure 8:
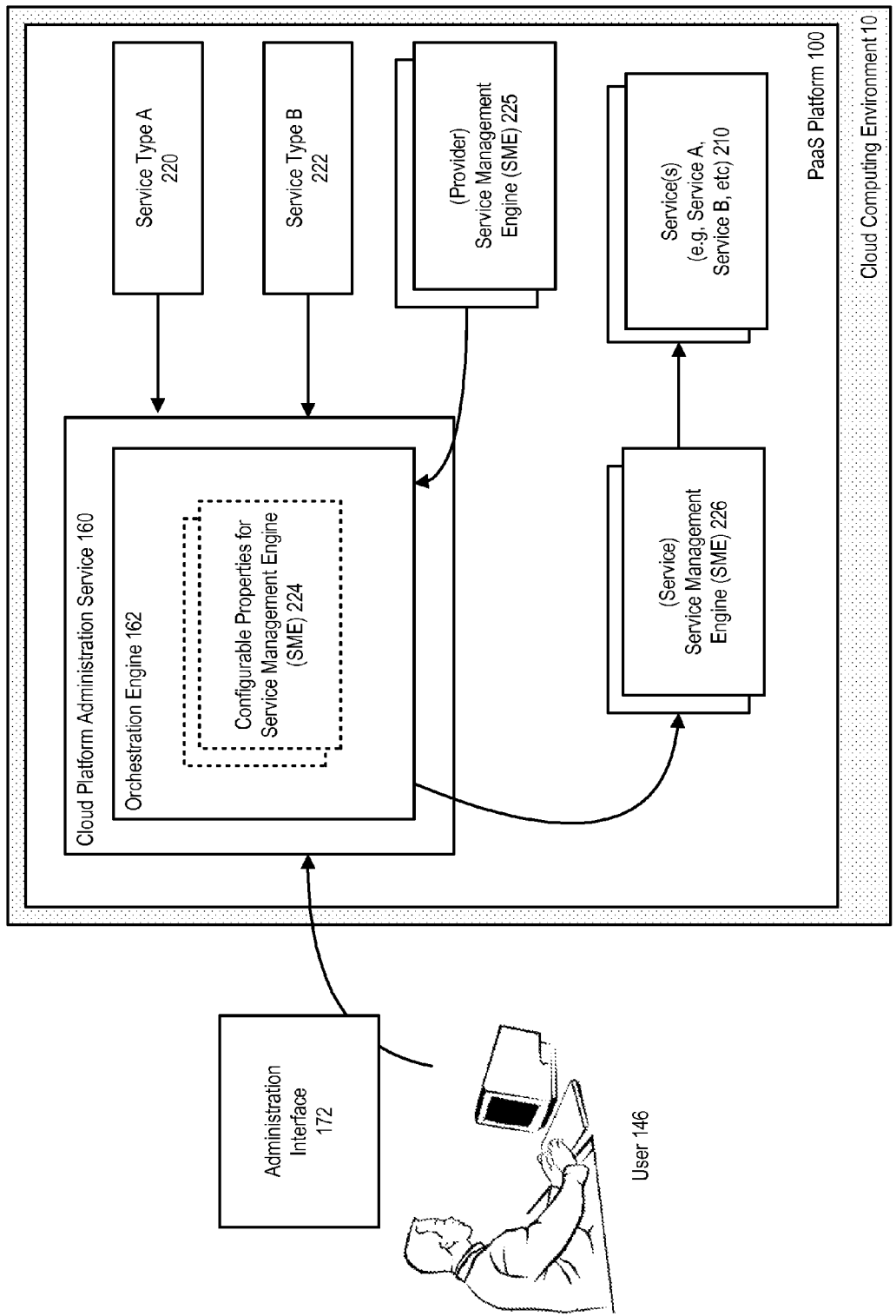
FIG. 8 illustrates the use of a service management engine, in accordance with an embodiment.

FIG. 8 illustrates the use of a service management engine, in accordance with an embodiment. In accordance with an embodiment, a Service Management Engine (SME) provides a generic means to plug any service type into the system. For example, an SME takes care of the service-specific provisioning, lifecycle, management, and monitoring support for a service type or provider type. There can be different classes of SMEs; for example, provider SMEs can be provided to handle different providers. Service SMEs can be dynamically incorporated into the platform domain by installing an appropriate SDP, which are then registered by the SDP manager. The set of registered service SMEs then become the service types that are available to Cloud Account Administrators to create services.

In accordance with an embodiment, each service type supported in the PaaS platform domain maps to a specific service SME. A service SME handles all service-related activities, such as creation, monitoring, management, patching, upgrade, and deletion for that service. In accordance with an embodiment, the contract that is implemented by an SME is referred to as a Service Management Interface (SMI).

Referring to the example shown in FIG. 8, when OVAB is used as a virtualization provider, interaction with the OVAB Deployer can be handled by a virtualization API (e.g., an OVAB client API). In accordance with an embodiment, the orchestration process can then proceed as follows: a Cloud Account Administrator can discover, e.g., SOA service types 220, 222 that are available in the PaaS platform domain, and initiate creation of an, e.g., SOA service. The orchestration engine iterates through the available service SMEs in the system, and determines which service SMEs can handle this service type 224. In this example, the orchestration engine can discover an appropriate SOA SME to handle creation of the SOA service. The orchestration engine can then call into the SME to get all provider dependencies for that SME 225. For example, the SME may return database and load-balancer provider dependencies. The orchestration engine can then call a get-user or similar configurable properties function for the SME, and expose those properties in a user interface, so that the Cloud Account Administrator can edit the properties if desired. User-provided inputs can be supplied to the SME, for example to update an OVAB deployment plan. The orchestration engine then performs any pre-provisioning association between the SME and the provider SMEs upon which it depends. For example, the orchestration engine can perform pre-provisioning association between the SOA SME and a database provider SME, which results in the creation of schema and tables required by the SOA service, in addition to populating the deployment plan with the database provider configuration. When any pre-provisioning association is complete, the orchestration engine can then call into the SME 226 to provision the service.

At this point, the deployment plan is generally complete except for network configurations. In accordance with an embodiment, the deployment plan together with an assembly ID can be pushed, e.g., to the OVAB API, which takes care of filling the deployment plan with the remaining network configurations. Then, the orchestration engine can call, e.g., a Web service API of the OVAB Deployer, to provision the OVAB assembly. Once the assembly is provisioned, the virtual machine information can be retrieved and passed back to the SME, which in turn passes the information back to the orchestration engine. The orchestration engine can then perform any post-provisioning association between the SME and the provider SMEs on which it depends. For example, post-provisioning association between the SOA SME and a load-balancer provider SME may result in the creation of a virtual server to handle and route requests for this SOA service.

Orchestration Engine (OE)

Figure 9:
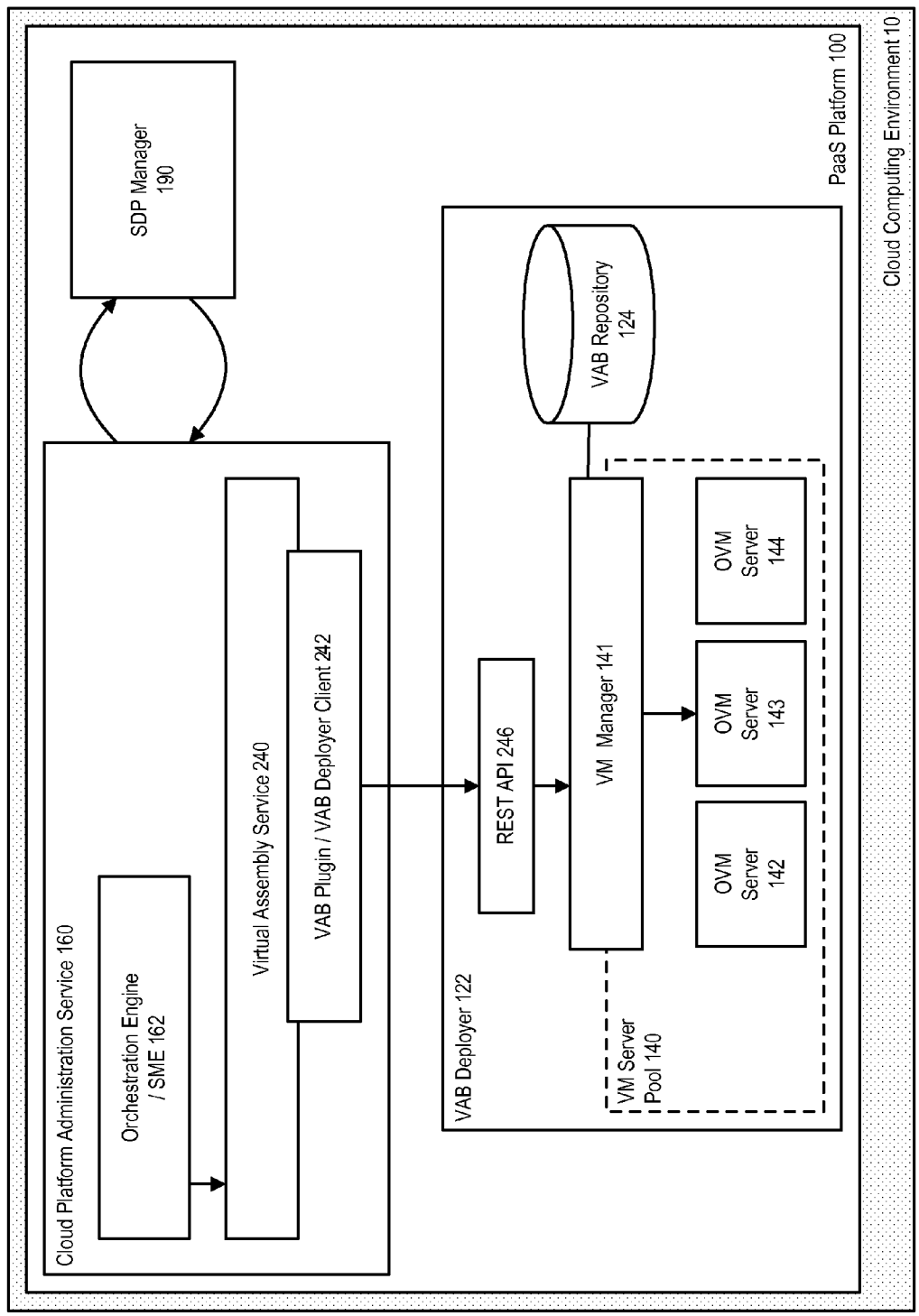
FIG. 9 illustrates the use of an orchestration engine, in accordance with an embodiment.

FIG. 9 illustrates the use of an orchestration engine, in accordance with an embodiment. In accordance with an embodiment, the orchestration engine enables life-cycle management of the services in a PaaS platform. In particular, the orchestration engine coordinates the interactions among various components in the platform domain while creating or managing a service, enables the pluggability of SMEs for various service types in the platform, aids in provisioning the service by selecting appropriate SMEs from among those available in the platform, and helps in managing the configuration of providers such as DB Providers, IDM Providers, and LB Providers.

In accordance with an embodiment, the orchestration engine, as part of creating a service, ensures that dependencies of the service, such as its provider dependencies, are satisfied, by selecting appropriate providers, and coordinating association between the providers and service. The act of association can be performed during pre-provisioning and/or post provisioning-phases. The act of installing and configuring an SME can be performed by the SDP manager as part of registering a pre-packaged service type or a customized service type. The orchestration engine helps expose the deployment plan configuration, which can be configured by the Cloud Account Administrator, including recognizing phases and tasks that match the requirements of the platform for its service creation action, and other life-cycle related activities.

In accordance with an embodiment, the orchestration engine also acts as a gateway for service management, monitoring, scaling actions that could be initiated by other containers in the PaaS platform domain, or by an administrator. For example, the elasticity engine, described in further detail below, can communicate with the orchestration engine to manage, monitor, and scale services based on a service's QoS configuration. The orchestration engine can also play a role in service maintenance actions, such as patching and upgrade, which may require disassociating or re-associating services in a phased manner.

In accordance with an embodiment, services created by a cloud account administrator are visible and accessible only to that particular cloud account (tenant), and are isolated from other cloud accounts in the PaaS platform domain. Such isolation can be provided by the orchestration engine with the help of a cloud account management module.

In accordance with an embodiment, SMEs can be registered with the orchestration engine such that multiple SMEs for a given "family" of service (e.g., "database") can be present in the system. A default SME can also be configured for a particular service family on a per-cloud account basis.

As shown in FIG. 9, in accordance with an embodiment, the orchestration and service management components can interface with the virtualization layer through a virtualization service 240, plugin 242, and virtualization API 246 that abstracts supported virtualization operations. In accordance with an embodiment that uses OVAB, this API can be an OVAB Deployer interface, which enables OVAB Deployer to perform the tasks of assembly creation. In accordance with an embodiment, the orchestration engine/SME can upload and deploys assemblies through the OVAB virtualization API, in addition to managing their lifecycle.

To support developer or demonstration scenarios, in accordance with an embodiment, the system can also implement solutions that run on native OS processes (i.e., with no virtualization). This capability can be implemented by providing a "physical plugin", which implements a portion of the virtualization API.

Elasticity Manager (EM)

Figure 10:
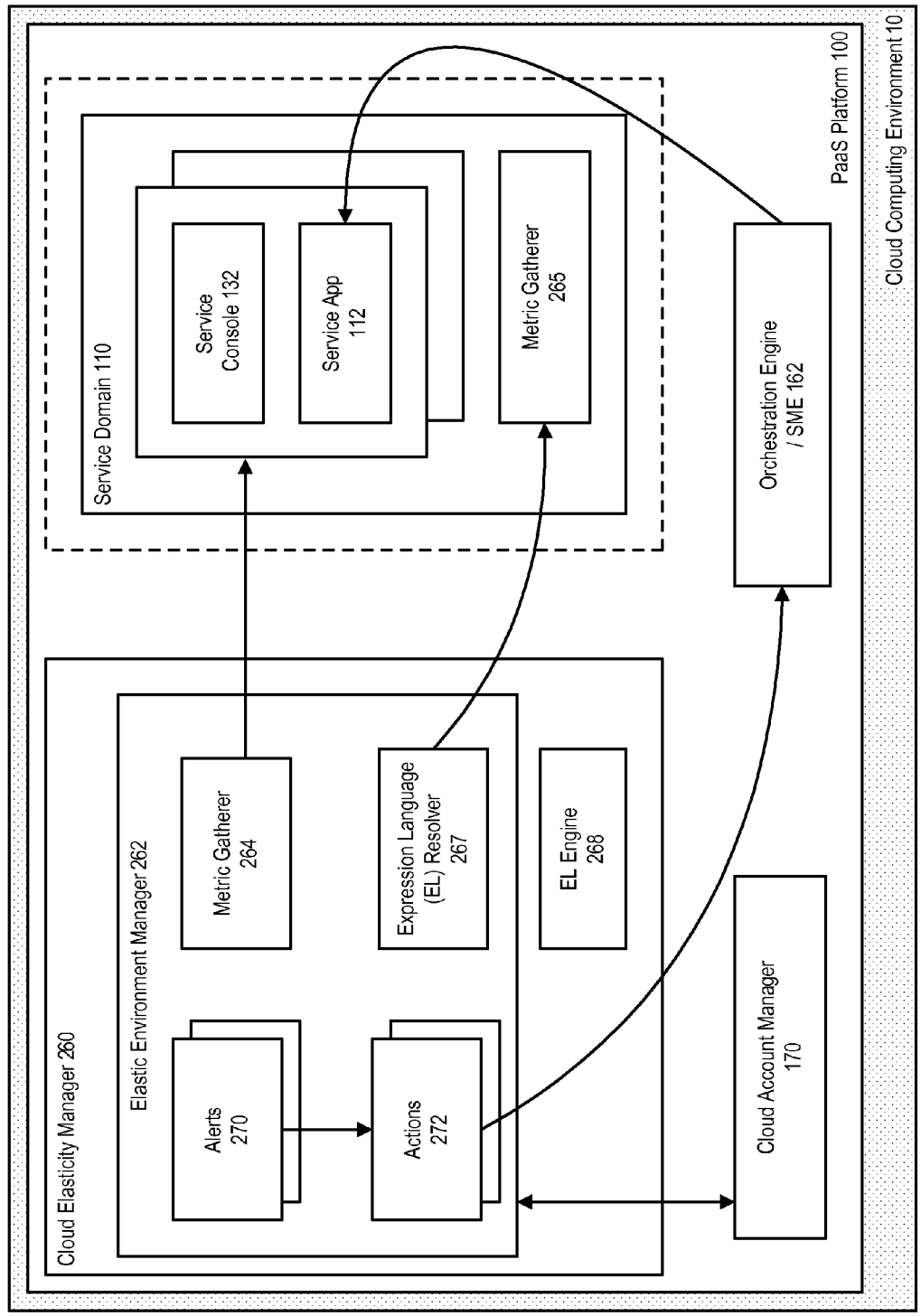
FIG. 10 illustrates the use of an elasticity manager, in accordance with an embodiment.

FIG. 10 illustrates the use of an elasticity manager, in accordance with an embodiment. As shown in FIG. 10, in accordance with an embodiment, the elasticity manager 260, including an environment manager 262, can use metric gatherers 264, 265 and alerts 270, e.g., as HK2 contracts, to determine the health of services running in an environment. Once the state of the environment is determined, the elasticity manager can take appropriate actions 272.

In accordance with an embodiment, a metric gatherer is an object that collects and maintains metric data about a service periodically. For example, a metric gatherer may periodically collect heap statistics such as used or committed memory; or metrics regarding CPU usage. Generally, the metric gatherers provide information about the state of some resource usage. Metrics can also be provided by external monitoring tools, for example by a Java bean component.

In accordance with an embodiment, an alert object periodically checks the health of a service in an environment, by analyzing metric data gathered by one or more metric gatherers over a period of time. For example, an alert may examine CPU usage for a previous several minutes to determine if the environment is under stress. After the alert determines the state of the service or environment, it can execute an action, such as sending an email, logging a message, sending an event, or scaling-up or scaling-down a service. In accordance with an embodiment, an alert can take multiple actions.

In accordance with an embodiment, the elasticity manager can include a unified Expression Language (EL) engine 268, which allows alerts and metric gatherers to be specified as EL expressions. In accordance with an embodiment, the elasticity manager allows external EL Resolver objects 267 to be registered, which enables other types of objects, such as MBeans or POJOs, to be used in an expression.

Update and Patching of SDPs

In accordance with an embodiment, services can be periodically maintained to ensure that they are up-to-date with, e.g., bug fixes, security updates and configuration changes. To help ensure homogeneous environments, services should be updated in a timely manner, with the same set of patches and configuration updates. In accordance with an embodiment, an update is defined to be a change which has to be made to the system; examples of which include application of a security patch, upgrade of a component, or changing of a configuration value. Depending on the type of update, some updates may require a service or system downtime, while other updates may not require a downtime; and each of these scenarios can be taken into account.

Service Resources and Feature Sets

As generally described above, in accordance with an embodiment, a service resource is a specialization of a service. Unlike services, which are created by explicit action of a cloud account administrator, and providers which are created on demand to satisfy the dependencies of services, service resources are associated with services to satisfy the dependencies of artifacts (applications) deployed to services. A service resource may be associated or disassociated with a service after the service has been created.

In accordance with an embodiment, a service resource can be provided using a provider type and a provider SME. A service definition package (SDP) for the service can specify a dependency on a provider, and include association rules that define actions to be taken with regard to a runtime of the provider. When the service is provisioned, a service resource type which is derived from a provider SDP can be associated with the service. As a result of the association, a service resource can be automatically created from the service resource type in accordance with the association rules, to provide resources for consumption by the application.

In accordance with an embodiment, the provider SDP can include a plurality of feature sets associated with different sets of configurable properties, which allows different provider types or service resource types to be created.

Figure 11:
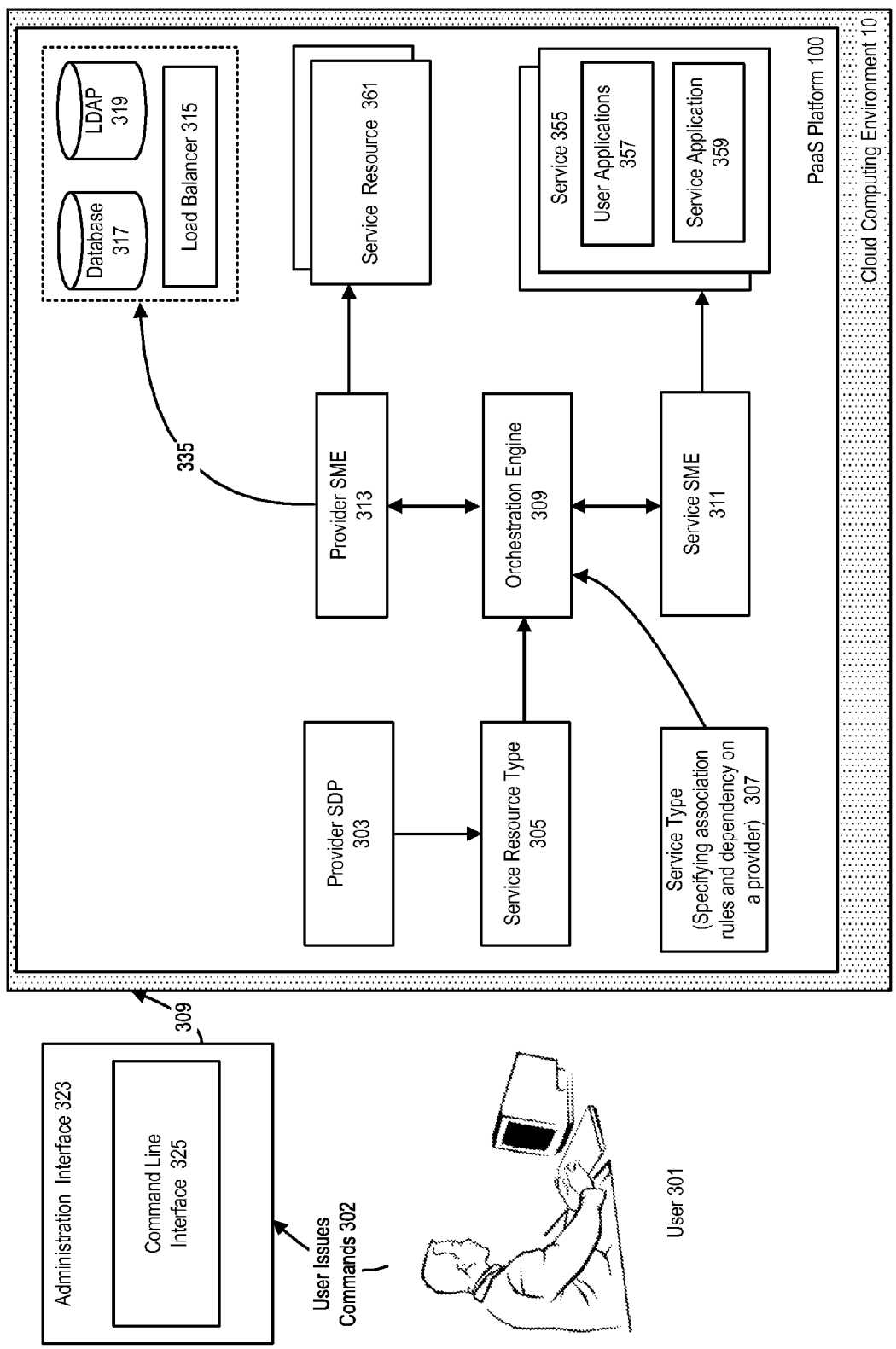
FIG. 11 illustrates a system for providing service resources for use by applications deployed to a service, in accordance with an embodiment.

FIG. 11 illustrates a system for providing service resources for use by applications deployed to a service, in accordance with an embodiment.

As illustrated in FIG. 11, in accordance with an embodiment, the system includes a cloud platform component provided as an installable software suite (e.g., PaaS platform 100) within a cloud computing environment 10, that supports provisioning of enterprise applications. In accordance with an embodiment, the cloud platform can include a provider SDP 303, a provider SME 313, and a service type 307. An administration interface 323 includes a command line interface 325, which allows a user 301 to issue commands 302 to interact with 309 various components in the cloud platform.

In accordance with an embodiment, when a service is to be provisioned, an orchestration engine 309 can invoke a service SME 311 to obtain provider dependencies as specified by the service type, and perform any pre-provisioning association between the service SME and the provider SME. As a result of the association, the provider SME can execute the association rules defined by the service type to perform actions 335 on a provider runtime, e.g., a database 317, an LDAP 319, and a load balancer 315, during various phases of the life cycle of the service.

As an illustrative example, the provider SME can create a schema and tables as required by the service in a database runtime. When the pre-provisioning association has completed, the orchestration engine can invoke the service SME to provision the service 355, which can include a service application 359 and one or more user applications 357.

In accordance with an embodiment, as part of the service creation, a user, for example a PaaS administrator or account administrator, can associate the service resource type with the service by an explicit action, e.g., a command. As a result of the association, a service resource 361 can be created automatically by the provider SME and associated with the service. In accordance with an embodiment, the provider SME can reference the same set of association rules when creating the service resource for the consumption of the user applications.

In accordance with an embodiment, a single schema can be created per service, and used by service resources and providers associated with that service. Such a schema can optionally be deleted when the service is terminated.

In an alternative embodiment, a single schema can be shared by multiple services and not deleted when the services are terminated. In accordance with an embodiment, a pluggable database, such as an Oracle 12c Pluggable Database, can be used to provide service resources.

Figure 12:
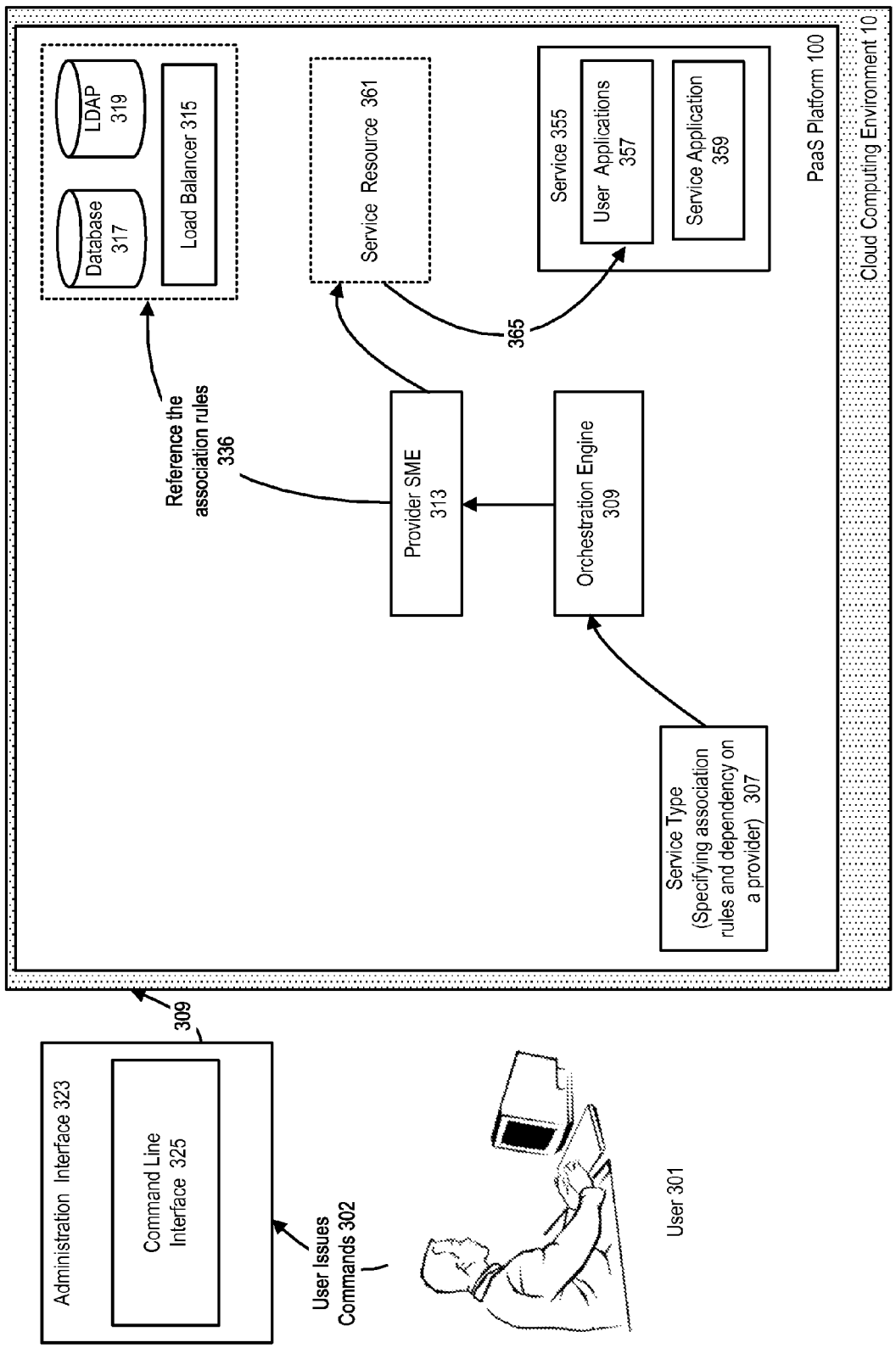
FIG. 12 further illustrates a system for providing service resources for use by applications deployed to a service, in accordance with an embodiment.

FIG. 12 further illustrates a system for providing service resources for use by applications deployed to a service, in accordance with an embodiment.

In accordance with an embodiment, the association rules in the service type can include an association and disassociation phase, each indicating actions to be performed in that phase. Association rules can be specified as a separate entity, and can be referenced using a reference tag, e.g., <association-rule-ref>.

In accordance with an embodiment, the association rules can be illustrated in a sample service definition, as illustrated in Listing 1:

Listing 1

```
<service-definition>
    ...
    <association-rules>
        <association-rule name="Database"/>
            <family name="Database"/>
            <phase name="association">
                <properties>
                    <!Accepted values of schema-type are "SQL" and
                    "RCU" >
                    <property name="schema-type" value="SQL"/>
                    <property name="schema-name.1" value="Oracle"/>
                    <property name="schema=prefix.1" value="db"/>
                    <property name="schema-password.1" value=
                    "Oracle123"/>
                    <file-property name="init-sql.1"
                        file="sql/initsql.sql"/>
                    <property name="datasource-name"
                        value="my-datasource"/>
                </properties>
            </phase>
            <phase name="dissassociation">
                <properties>
                    <property name="drop-schemas" value="true"/>
                    <file-property name="tear-down-sql"
                        file="teardownsql.sql"/>
                </properties>
            </phase>
        </association-rule>
    </association-rules>
    <dependencies>
        <!PROVIDER DEPENDENCY>
        <provider name="SERVICE_DATABASE_DEPENDENCY"
        optional="true">
            <selection-criteria>
                <family>Database</family>
                <!can provide other characteristics like version/vendor
                    for selection -->
            </selection-criteria>
            <association-rule-ref name="Database"/>
        </provider>
    </dependencies>
    ...
</servicedefinition>
```

As shown in the example of Listing 1, the <association-rule> named Database specifies the details about the account (schema) that needs to be created, e.g., the type of the schema and scripts used to create the schema during the association phase, whether the schema needs to be deleted, and the tear-down SQL that can be used during the disassociation phase.

As further shown in FIG. 12, in accordance with an embodiment, the association rules can be used 336 by the provider SME to create the service resource for the consumption of the user applications deployed to the service.

In accordance with an embodiment, the service resource can be created and associated with the service implicitly. As an illustrative example, when the service is to be provisioned, a PaaS or account administrator can execute a command to associate the service resource type with the service using the name of the association rules as a parameter. As a result of the association, a service resource can be automatically created and associated with the service. Alternatively, the service resource can be created and associated explicitly with the service using commands.

In accordance with an embodiment, the orchestration engine can invoke the provider SME to create the service resource in accordance with the association rules, and coordinate with the service SME to create necessary resources in the service for the application's consumption. The SDP schema can be created in such a way that the association rules can be referred from commands at the administration interface.

In accordance with an embodiment, the provider SME can create, e.g., a database schema or other service resources at a provider server, e.g., a database server, and return a service resource configuration object that can be used 365 by the service to provide resources to user applications deployed to the service. Additionally, in accordance with an embodiment, the provider SME (e.g., a database provider SME) can support sharing a schema (e.g., database account), and retaining or deleting a schema upon unprovising a service.

Feature Sets Support in an SDP

Figure 13:
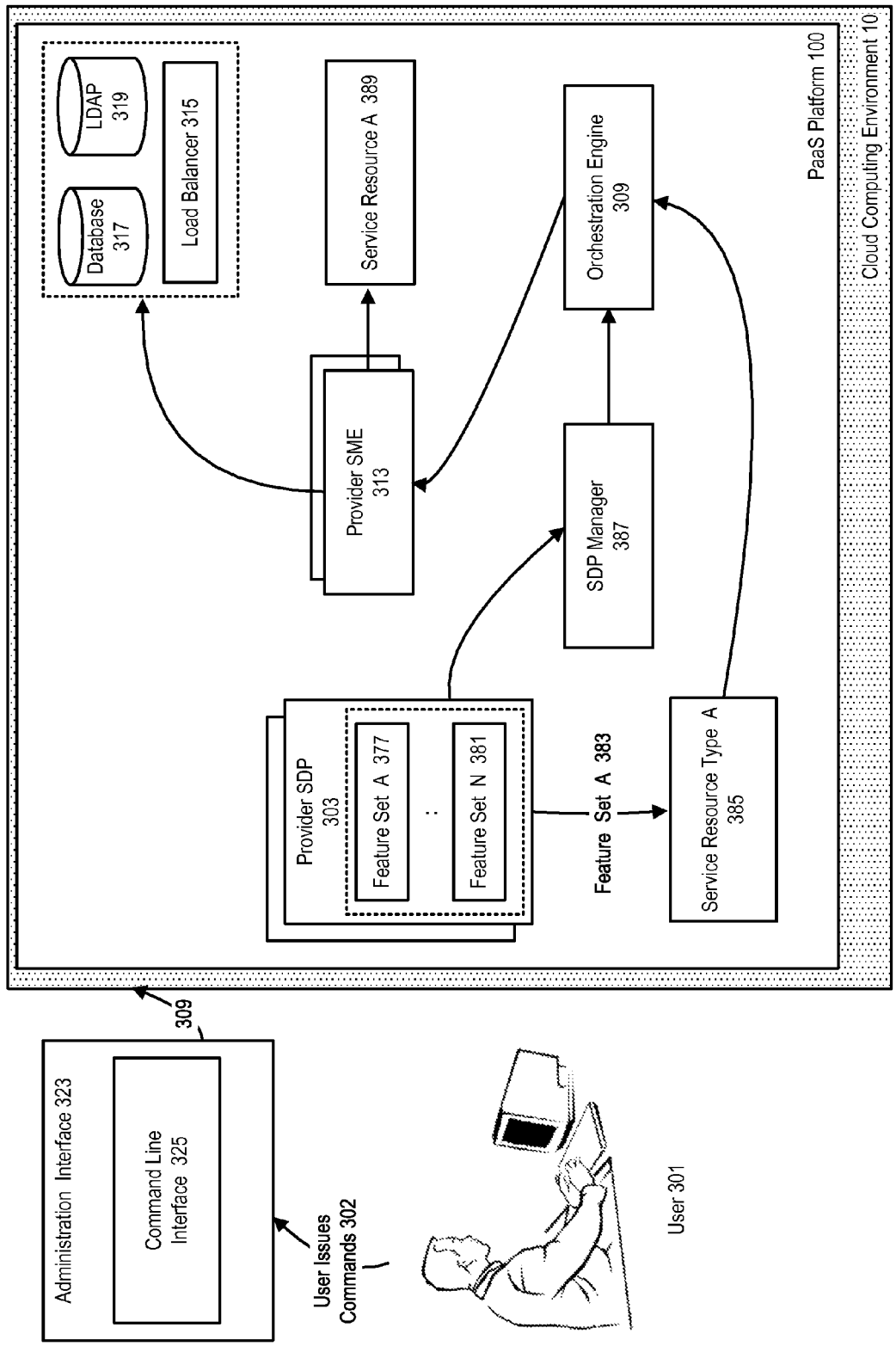
FIG. 13 further illustrates a system for providing service resources for use by applications deployed to a service, in accordance with an embodiment.

FIG. 13 further illustrates a system for providing service resources for use by applications deployed to a service, in accordance with an embodiment.

As shown in FIG. 13, in accordance with an embodiment, the provider SDP can include multiple feature sets 377 through 381, wherein each feature set is associated with a different set of configurable properties. As an illustrative example, an Oracle Database SDP can support a variety of Oracle Databases spanning legacy Oracle database, Oracle RAC, and Oracle 12c with virtualized database support; and the different types of databases can require different set of configurable properties.

In accordance with an embodiment, a plurality of feature sets can be provided in the service definition xml, and can be used to create different service provider types or service resource types. As an illustrative example, when creating a service provider type, a PaaS administrator can select a feature set from the available sets, and, if none is specified, use a default feature set. In accordance with an embodiment, the SDP manager 387 can validate the configurable properties associated with a selected feature set. A CLI/GUI support can be provided to expose an appropriate set of configurable properties, instead of exposing all available configurable properties.

Similarly, when creating a service resource type, a user can select a feature set. Based on the selected feature set, the user can provide appropriate property values. An SDP manager can perform validation based on the selected feature set. If no feature set is specified as part of the service resource type, the feature set marked as default can be selected.

For example, as shown in FIG. 13, the feature set A is selected 383 to create a service resource type A 385. The created service resource type can be provided to the orchestration engine, which invokes the provider SME to create a service resource A 389 based on the service resource type.

In accordance with an embodiment, a sample service definition xml for Oracle DB SDP that can support legacy Oracle Database and Oracle RAC is illustrated in Listing 2:

Listing 2

```
<service-definition>
    ...
    <tenancy model="ANY"/>
    <characteristics>
        <family>Database</family>
        <characteristic name="Vendor" value="Oracle"/>
        <characteristic name="product" value="Database"/>
    </characteristics>
    <feature-sets>
        <feature-set name="ORACLE-DB"
                description="This feature-set covers all legacy
                Oracle Database scenario"
                default="true">
            <property-set-ref name="common"/>
            <property-set-ref name="hostport"/>
```

Listing 2
-continued

```
        </feature-set>
        <feature-set name="ORACLE-RAC-DB" description="This
                Feature-set covers multimode Oracle RAC Database
                scenario">
            <property-set-ref name="common"/>
            <property-set-ref name="rac-nodes"/>
            <property-set-ref name="rac-ons-nodes"/>
        </feature-set>
        <feature-set name="ORACLE-RAC-DB-SCAN-ADDR"
            description=
                "This feature set covers Oracle RAC
                Database configured with SCAN address
                scenario">
            <property-set-ref name="common"/>
            <property-set-ref name="hostport"/>
            <property-set-ref name="rac-ons-nodes"/>
        </feature-set>
    </feature-sets>
    <properties>
        <property-set name="hostport">
            <property name="db-host" datatype="STRING"/>
            <property name="db-port" datatype="INTEGER"/>
        </propertyset>
        <property-set name="common">
            <property name="db-name" data-type="STRING"/>
            <property name="db-user" data-type="STRING"
                value="sys"/>
            <property name="db-password" data-type="STRING"/>
            <property name="db-role" datatype="STRING"
                value="sysdba"/>
        </property-set>
        <propertyset name="rac-nodes">
            <table-property name="rac-node">
                <entry>
                    <property name="host" datatype="STRING"/>
                    <property name="port" datatype="INTEGER"/>
                </entry>
            </table-property>
        </property-set>
        <propertyset name="rac-ons-nodes">
            <table-property name="rac-ons-node" optional="true">
                <entry>
                    <property name="host" datatype="STRING"/>
                    <property name="port" datatype="INTEGER"/>
                </entry>
            </table-property>
        </property-set>
    </properties>
    <service-management-engine
            id="com.oracle.cloudlogic.paas.oracledb.provider">
        <file>
            <location>paas.oracledbprovider.jar</location>
        </file>
    </service-management-engine>
</service-definition>
```

As shown in the example of Listing 2, the sample service definition xml defines a complete set of supported feature sets, and each feature set can refer to one or more property sets that can be used to provide property values when creating provider types or service resource types.

In accordance with an embodiment, a service definition file in a service SDP can similarly define a complete set of supported feature sets, wherein each feature set can refer to one or more dependencies. When creating a service type, a user can select a feature set. Later, when the service is created using that service type, an orchestration engine can associate the service with dependencies based on the selected feature set. If no feature set is specified as part of the service type, the feature set marked as default can be selected.

Associating a Service Resource with a Service

In accordance with an embodiment, a service resource can be created from a service resource type as follows:

```
padmin create-service-resourcetype --sdp oracle-sdp
my-oracle-11g-service-resource-type
cadmin create-service-resource --serviceresourcetype
my-oracle-11g-service-resource-type --tenant a1 --environment e1
my-oracle-11g-resource
``` wherein my-oracle-11g-resource-type is the name of service-resource-type and "my-oracle-11g-resource" is the created service-resource name. An account admin can associate the service-resource and service as follows:

```
cadmin associate-service --servicename java-service --tenant a1
associationrulename=
Database myoracle11gresource
```

In the above sample, "Database" is the name of <association-rule> specified in service-definition.xml.
Association Rules Customization In accordance with an embodiment, multiple service resource types can be associated with a service in accordance with a single set of association rules, to create multiple service resources to serve user applications deployed to the service.

In accordance with an embodiment, when associating service resources with a service, the association rules can be customized to reduce conflicts. As an illustrative example, in cases where the association rules include the "datasource-name" for the data source that needs to be created in the service, sharing the datasource among multiple service resources that are to be associated with the service can result in conflicting data sources. Association rules can be customized using a command as illustrated below:

```
cadmin associate-service --servicename java-service --account a1
--association-rule-name=Database
--properties=p1.properties.property.datasource-name=my-customized-ds
my-oracle-11g-resource
```

As shown in the example above, the format to be used to reference a property for customization is <phase-name>.properties.property.<property-name>=value. In accordance with an embodiment, the parameter --properties can accept the properties of the association rules defined in the service definition file of the service SDP.

Figure 14:
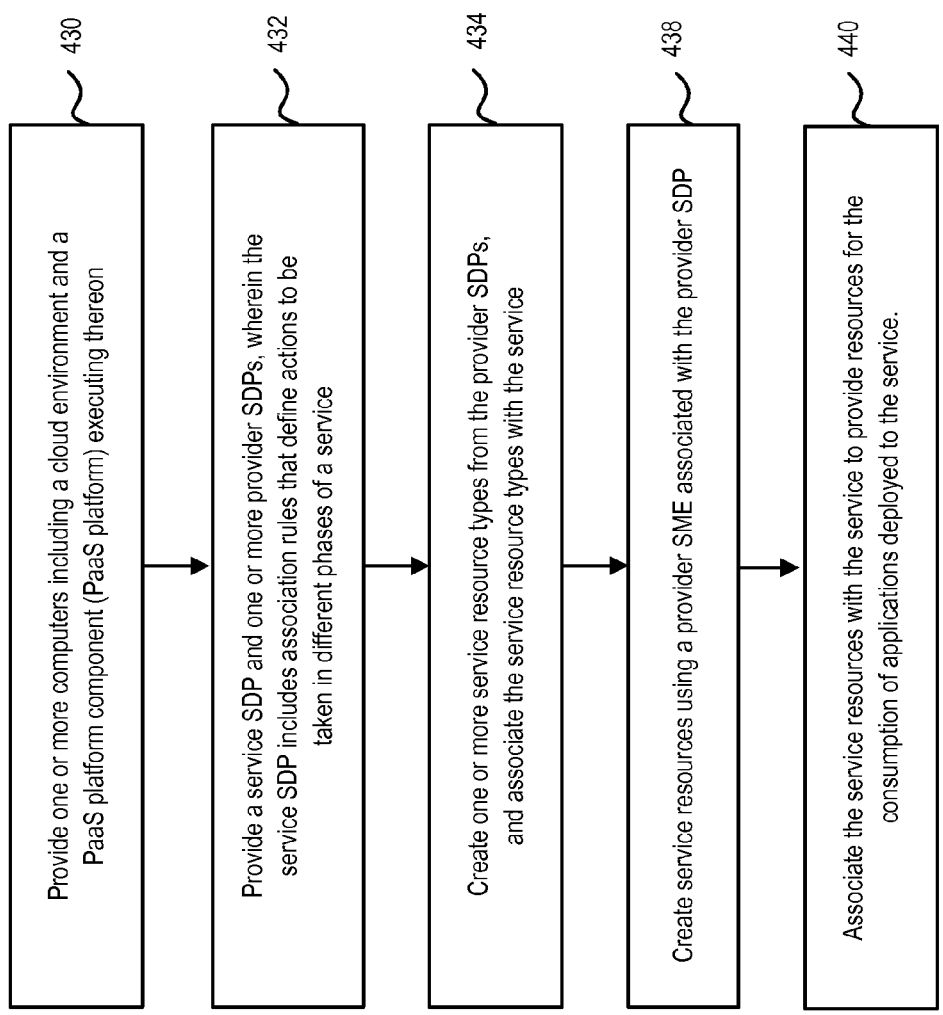
FIG. 14 illustrates a method for providing service resources for use by applications deployed to a service, in accordance with an embodiment.

FIG. 14 illustrates a method for providing service resources for use by applications deployed to a service, in accordance with an embodiment. As shown in FIG. 14, in accordance with an embodiment, at a first step 430, one or more computers including a cloud environment and a PaaS platform component (PaaS platform) executing thereon are provided.

At step 432, a service SDP and one or more provider SDPs are provided, wherein the service SDP includes association rules that define actions to be performed with regard to a provider runtime in different phases of a service.

At step 434, one or more service resource types are created from the provider SDPs, and associated with the service.

At step 438, service resources are created using a provider SME associated with the provider SDP.

At step 440, the created service resources are associated with the service to provide resources for use by applications deployed to the service.

Figure 15:
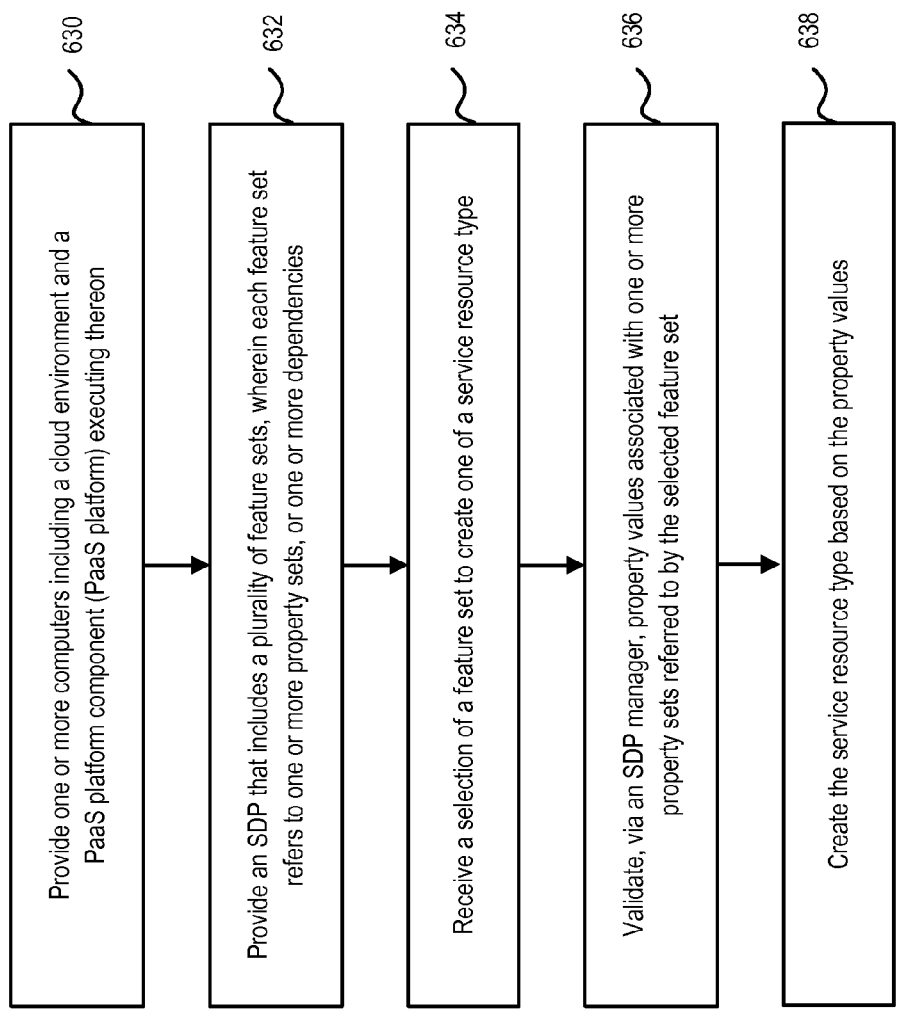
FIG. 15 further illustrates a method for providing service resources for use by applications deployed to a service, in accordance with an embodiment.

FIG. 15 further illustrates a method for providing service resources for use by applications deployed to a service, in accordance with an embodiment. As shown in FIG. 15, in accordance with an embodiment, at a first step 630, one or more computers including a cloud environment and a PaaS platform component (PaaS platform) executing thereon are provided.

At step 632, an SDP that includes a plurality of feature sets is provided, wherein each feature set refers to one or more property sets, or one or more dependencies.

At step 634, a feature set is selected to create a service resource type.

At step 636, property values associated with one or more property sets referred to by the selected feature set are validated by an SDP manager.

At step 638, the service resource type is created based on the property values.

Disassociating Service Resources from a Service

In accordance with an embodiment, for a service resource created by virtue of associating a service resource type with a service, disassociating the service resource type from the service can automatically terminate the service resource. Alternatively, an account administrator can dissociate a service resource from a service using the following command:

```
cadmin dissociate-service --servicename javaservice --account a1
associationrulename=Database my-oracle-11g-resource
```

In accordance with an embodiment, the provider SME that manages the service resource can ensure that no artifacts (applications) are using resources of the service resource, e.g., a datasource created as a result of association, when dissociating the service resource from the service.

Life Cycles of a Service Resource

In accordance with an embodiment, a service resource can be started or stopped by the SME that supports the service resource. Support for start or stop on a service resource can be based on those entities the SME generates as service resources.

In an illustrative example, in the case of a schema being represented as a service resource, a stop or start operation is not appropriate, and so the SME may not support start or stop operations. In another illustrative example, in the case of a service resource representing a pluggable database, e.g., an Oracle Pluggable Database of 12c, a start or stop can be supported by the SME. In order to support the above capability, two additional commands "start-service-resource" and "stop-service-resource" can be provided:

```
cadmin start-service-resource [--tenant] service-resource-name
cadmin stop-service-resource [--tenant] service-resource-name
```

In accordance with an embodiment, when an SME does not provide support for start or stop operations, additional commands can be used to start or stop the service resource. An SME that supports a service resource may not know whether the service is created by an explicit action of a user. If the start or stop call is through the orchestration engine (OE), then the OE can determine and prevent such operation if the resource was automatically provisioned.

In accordance with an embodiment a service resource can be terminated by an explicit action of an account administrator, e.g., using a command such as the following:
cadmin terminate-service-resource [--account] service-resource-name In accordance with an embodiment, a service resource can be terminated only when no service is using the resource. Similarly, a service resource type can be deleted only when no service resources are present for, or when no service type is using, that service resource type, even if no services are created from the service type. Terminating an automatically-generated service resource, i.e., a service resource that is created by virtue of associating a service resource type with a service, is not allowed.

Scopes of Service Resources

In accordance with an embodiment, service resource types can be created and managed by a PaaS administrator or by an account administrator. Service resource types created by a PaaS administrator are global in scope and are visible to all accounts in a PaaS domain, while resource types created by an account administrator are account-scoped resources and usable only by services provisioned within the account.

In accordance with an embodiment, a list of commands related to service resource type creation, e.g., create-service-resource-type, delete-service-resource-type, configure-service resource-type, can be provided to both the system administrator and the account administrator, so that both roles can create and manage service resource types. Additionally, in accordance with an embodiment, an account administrator can be provided with a command to list service resource types that include both global and account scoped resources.

Global and Account Scoped Resources Types

The resource configuration that represents the database (database coordinates) can be created and managed by two different roles. One by the system administrator and the other by account administrator.

Configuring Global Resource Types

Resource types created by system administrator are called as global resources and are visible to all accounts in the cloudlogic domain:

```
padmin create-service-resource-type --sdpname <sdpname>
   --properties <name-value-pairs> service-resource-type-name
```

For the database service resource or database provider example, the create-service-resource-type command would look like:

```
padmin create-service-resource-type --sdpname oracledb-provider
--properties user=APP:password=APP:host=myHost.oracle.com:port=1521
my-oracle-service-resource-type
```

Configuring Account Scoped Resource Types

In accordance with an embodiment, a command to list all the SDPs in a PaaS domain can be exposed to a PaaS administrator and an account administrator, so that the account administrator can reference an SDP to create a service resource type. An SDP, when loaded via a "load-sdp" command or operation, can be marked to indicate whether it is meant to be used to provision "service" or "provider" or "any" via a parameter named "usefor". In accordance with an embodiment, a value "service-resource" can be added for the parameter, to indicate that the SDP is meant to be used only as "service-resource", and to filter only the SDPs that marked as "any" or "service-resource", to avoid listing "service" or "provider" only SDPs.

Use Cases

As described above, in accordance with various embodiments, service resources can be created and associated with a service to provide resources for the consumption of applications deployed to a service. Described below are various use cases to illustrate these features. Although the use cases are generally directed to database resources, the features are applicable to any type of resources that can be consumed by applications deployed to a service.

Use Case 1: Supporting a Schema per Service

In accordance with an embodiment, a schema (account) can be created per Java service. Such a schema can be optionally deleted when the Java service is terminated or unprovisioned.

Use Case 2: Using a Configured Container Database (CDB)

In accordance with an embodiment, a PaaS administrator or an account administrator can configure the service resource type that has information about host and port representing a CDB (coordinates of the CDB) and necessary credentials/authorization. As an illustrative example, a PaaS administrator can configure a service resource type using the following command:

```
padmin create-service-resourcetype --sdp OracleDatabase -properties
systemUser=xxxxx:systemPassword=xxxxx:hostname
=xxxx.us.oracle.com:portNumber=1521:databaseName=
orcl.us.oracle.com:sysUserRole=sysdba:dbType=Oracle12c
my-oracle-12c-resource-type
```

In accordance with an embodiment, a service definition of an Oracle database SDP can include a configurable property, e.g., "dbType", to indicate whether the database being configured is 12c or RAC. In the above example, the "dbType" is configured to indicate that the Oracle database is of type 12c. An account administrator can create a PDB by using the following command:

```
cadmin create-service-resource --serviceresourcetype
   my-oracle-12c-resource-type -tenant a1 -environment e1
   my-oracle-12c-pdb
```

In accordance with an embodiment, an account administrator can associate the service-resource-type and a Java service by specifying the service-resource type using the following command:

```
cadmin associate-service -tenant a1 --servicename JavaService
   --associationrulename Database my-oracle-12c-pdb
```

As shown above, in accordance with an embodiment, a database provider SME can use a container database (CDB) to create one or more PDB. When a service needs a database, a service resource SME, which can be the database provider SME in accordance with an embodiment, uses the coordinates of the CDB and the credentials/authorization information to connect to the CDB database server, requests that a new PDB database be created with a schema (account) for use by applications deployed to a service, and stores the resulting information in the created service resource instance:

In accordance with an embodiment, when the service is associated with the service resource instance, it can create a service resource association resource object that tracks the way in which this service is using this service resource. In particular, a Java EE service can create a connection pool to refer to the database server.

Use Case 3: Supporting Service Resources to Use Existing Schema/Account

There may be use cases where an administrator (a PaaS administrator or an account administrator) wants to refer to an existing database installation to be used to satisfy artifact dependencies of a service. Such an existing schema can be referred by multiple services and would not be deleted when the services are terminated or unprovisioned. In accordance with an embodiment, the administrator can configure a service resource type with the coordinates of the existing database installation:

```
cadmin create-service-resource-type --sdp external-oracle-database.sdp
--properties dbhost=host1:dbport=port1 externalappdbtype2
```

In accordance with an embodiment, the administrator can create a service resource that corresponds to a particular existing account on that database server:

```
$ cadmin create-service-resource --service-resource-type appdb1
--properties dbuser=scott app-pdb1 svcres1 (service resource instance):
dbhost=myvdbserver.cloudlogic.com pdbid=app-pdb1 dbuser=scott (or
some new account created for this service resource)
```

In accordance with an embodiment, the administrator can create a Java service instance from a Java service type and specifies that a dependency of the Java service instance be satisfied through the named service resource instance "externalappdbinstance1":

```
$ cadmin create-service --service-type javast1 -dependencies
app-db-dep=externalappdbinstance1 javasvc1
```

Followed by associating the PDB with Java Service:

```
cadmin associate-service --association-rule-name= Database --servicename
my-java-service
--tenant a1 my-oracle-12c-pdb
```

In accordance with an embodiment, when a service is associated with the service resource, it can create a service resource association resource object that tracks the way in which this service is using this service resource. For example, a Java EE service can create a connection pool to refer to the database server. Since a database server can have multiple accounts, the administrator can create other service resources representing other accounts on that same database server.

In accordance with an embodiment, a service resource type is specific to that account, and other accounts cannot use it to create service resources referring to that database server. For example, a database provider SME can support sharing a repository creation utility (RCU) schema, where the RCU is a tool that can create and load a schema in a database. The database provider's SDP service definition file can support the following properties:

```
<table-property name="dbschemas">
    <entry key="schema-id">
        <!--component id is optional, applicable only for RCU case -->
        <property name="component-id"/>
        <property name="schema-name"/>
        <property name="schema-password"/>
    </entry>
</table-property>
```

In accordance with an embodiment, an account administrator can create a service resource type as follows:

```
cadmin create-service-resource-type
    --properties systemUser=system:systemPassword=Oracle123:\\\\
    sysUserRole=sysdba:hostname
        =10.133.184.154:portNumber=1523:databaseName=orcl:\\\\
    db-schemas.1.component-id
        =OPSS:db-schemas.1.schema-name=MYSCHEMA OPSS:\\\\
    db-schemas.1.schema-password=ORACLE123:\\\\
    db-schemas.2.component-id
        =IAU:db-schemas.2.schema-name=MYSCHEMA IAU:\\\\
    dbschemas.2.schema-password=ORACLE123 \\\\
    my-shared-oracle-db resource-type
```

In accordance with an embodiment, an account administrator can create a service resource from the service resource type and associate the service resource with a service using commands. The database provider SME can additionally support sharing standard (SQL based) schemas. The database provider's SDP service definition file can support the follow properties:

```
<table-property name="db-schemas">
    <entry key="schema-id">
        <property name="schema-name"/>
        <property name="schema-password"/>
    </entry>
</table-property>
```

In accordance with an embodiment, a service resource type from the service definition can be created as follows:

```
cadmin create-service-resource-type
    properties systemUser=system:systemPassword=Oracle123:\\\\
    sysUserRole=sysdba:hostname
        =10.133.184.154:portNumber=1523:databaseName=orcl:\\\\
    db-schemas.1.schema-name=MYSCHEMA_APP_SCHEMA:\\\\
    db-schemas.1.schema-password=ORACLE123 \\\\
    my-shared-oracle-db-resource-type
```

An account administrator can create a service-resource by using create-service-resource command:

```
cadmin create-service-resource --serviceresourcetype
my-shared-oracle-db-resourcetype --tenant
a1 -- environment e1 my-shared-oracle-db-resource
```

The service-resource can be associated with the service as follows:

```
cadmin associateservice --servicename JavaService
--association-rule-name=Database --tenant
a1 my-shared-oracle-db-resource
```

Service Resources Example

In accordance with an embodiment, an example implementation of the approach for providing service resources for the consumption of applications deployed to a service in a cloud environment can be demonstrated as follows. As illustrated below, the system can support creating, configuring, listing and deleting service-resource-types; creating, terminating, starting, stopping and listing service resources; associating a service with the service resource created; and disassociating the service and the associated service resource.

Additionally, in accordance with an embodiment, the implementation can support commands, e.g., list-sdp-associations and list-sdp-association-rules, to enable an administrator to customize association rule properties; and customization of association rule properties while associating the service resource with a service.

1. Download the PaaS platform (e.g., Cloudlogic) installer.
2. Setup CloudLogic following the instructions provided, and start a domain.
3. Download the Java-Service sdp.
4. Create the virtualization provider type:

```
padmin create-virtualization-provider-type-physical native
Command create-virtualization-provider-type-physical executed
successfully.
```

5. Load the Java-Service sdp:

```
padmin load-sdp $DOWNLOADS/java-service-native.sdp SDP loaded
with name Java-Service.
Assembly uploaded with name JavaService, version 1.
service-definition-package
element created with name Java-Service.
Application deployed with name
com.oracle.cloudlogic.services.paas.java-service-4.0.1.SNAPSHOT.
Command load-sdp executed successfully.
```

6. Create a tenant, say 't' and an environment 'e' for the tenant:

```
padmin create-tenant t
Tenant t created successfully. Tenant Administrator for this tenant is:
admin
Command create-tenant executed successfully.
cadmin create-environment --tenant t e Environment e created successfully
Command create-environment executed successfully.
```

7. Create service-type for the Java-Service sdp loaded:

```
padmin create-service-type --sdp Java-Service java-service A service
type with name java-service has been created.
Command create-service-type executed successfully.
```

8. Create a java-service, say my-java-service, for the tenant 't', in the environment 'e':

```
cadmin create-service --tenant t --environment e --servicetype java-service
my-java-service Command create-service executed successfully.
```

9. The padmin can view the sdps loaded using the list-sdps command:

```
padmin list-sdps NAME
Oracle-Traffic-Director Identity-Management JavaDB
OracleDatabase Oracle-RAC-Database Oracle-Virtualized-Database
Java-Service
Command list-sdps executed successfully.
```

10. With the list of sdps available from the above command, the padmin can now create a service-resource-type. In this demonstration we choose to use Oracle-Virtualized-Database:

```
padmin create-service-resource-type --sdp Oracle-Virtualized-Database
--properties db-hosts-pool.cdb1.systemUser=sys:db-hosts-poo A service
resource type with name oracle-service-resource-type has been created.
Command create-service-resource-type executed successfully.
```

In the above case, we use pooled 12c CBD. Also, one cannot use a mix of pooled and non-pooled database host while specifying the properties.

```
padmin create-service-resource-type --sdp Oracle-Virtualized-Database
--properties db-hosts-pool.cdb1.systemUser=sys:db-hosts-poo remote
failure:
Configuration not added. Properties for both pooled database hosts and
non pooled database host are provided. Onl Command
create-service-resource-type failed.
```

11. One can view the list of service-resource-types created, using list-service-resource-types command:

```
padmin list-service-resource-types oracle-service-resource-type
Command list-service-resource-types executed successfully.
```

12. Service-resource-type created can be configured using the configure-service-resource-type command.

13. Service-resource can be created using the above created service-resource-type:

```
15. cadmin create-service-resource --serviceresourcetype
oracle-service-resource-type --environment e --tenant t
oracle-service-resou
7%: create-service-resource.Provisioning phase.service-resource
provisioning:
Processing Service Definition for [oracle-servi
21%: create-service-resource.Provisioning phase.service-resource
provisioning:
Create service-resource [oracle-service-resour 57%:
create-service-resource.Provisioning phase.service-resource
provisioning.oracle-service-resource: Retrieved properties fr 39%:
create-service-resource.Provisioning phase.service-resource
provisioning.oracle-service-resource: Retrieved properties fr 57%:
create-service-resource.Provisioning phase.service-resource
provisioning.oracle-service-resource: Created Pluggable Datab 64%:
create-service-resource.Provisioning phase.service-resource provisioning:
Register service-resource [oracle-service-resou 71%:
create-service-resource.Provisioning phase.service-resource provisioning:
Service-resource [oracle-service-resource] regi 86%:
create-service-resource:
Registering service-resource with updated status
17. Command create-service-resource executed successfully.
```

14. The service-resource created can now be associated with the existing service that was created previously:

```
cadmin associate-service --tenant t --serviceresourcename
oracle-service-resource my-java-service Command associate-service
executed successfully.
```

15. list-service-resources command lists the service-resources created and the services associated with the service-resource:

```
cadmin list-service-resources --tenant t
SERVICE-RESOURCE SERVICE-RESOURCE-TYPE
oracle-service-resource oracle-service-resource-type [my-java-service]
Command list-service-resources executed successfully.
```

16. Also, list-services command with --long option, lists the services along with the service-resources that are associated with service.

17. When the service-resource is associated with a service, terminating or stopping the particular service-resource is not allowed:

```
cadmin stop-service-resource --tenant t oracle-service-resource
remote failure: Stop operation is not allowed when one or more services
are associated with the service-resource [ oracle-service Command
stop-service-resource failed.
cadmin terminate-service-resource --tenant t oracle-service-resource
remote failure: The service-resource [oracle-service-resource] is still
associated with service [my-java-service] Command
terminate-service-resource failed.
```

18. Dissociate-service command can be used to dissociate the service and the service-resource:

```
cadmin dissociate-service --tenant t --serviceresourcename
oracle-service-resource my-java-service Command dissociate-service
executed successfully
cadmin list-service-resources --tenant t
SERVICE-RESOURCE SERVICE-RESOURCE-TYPE SERVICE
oracle-service-resource oracle-service-resource-type [ ] Command
list-service-resources executed successfully
```

The above list-service-resources command shows that the service 'my-java-service' is no longer associated with the service-resource 'oracle-service-resource'.

19. The list-sdp-associations command lists the possible associations of a given sdp:

```
        cadmin list-sdp-associations --tenant t Java-Service
        ASSOCIATION-NAME
            ASSOCIATION-RULE-REF-NAME PRIORITY
        SERVICE_DATABASE_DEPENDENCY
        SERVICE_DATABASE_DEPENDENCY -
        Command list-sdp-associations executed successfully.
```

20. The list-sdp-association-rules command gives the association-rules that are applicable for the given sdp:

```
cadmin list-sdp-association-rules --tenant t Java-Service
<association-rules>
<association-rule name="IDM_DEPENDENCY">
<selection-criteria>
<family>IdentityManagement</family>
</selection-criteria>
<phase name="p1" values="post-provisioning"/>
<phase name="p2" values="pre-unprovisioning"/>
</association-rule>
<association-rule name="SERVICE_DATABASE_DEPENDENCY">
<selection-criteria>
<family>Database</family>
</selection-criteria>
<phase name="p1" values="post-provisioning post-create">
<properties>
<property name="schema-name.1" value="Oracle"/>
<property name="schema-prefix.1" value="db"/>
<property name="schema-password.1" value="Oracle123"/>
</properties>
</phase>
<phase name="p2" values="pre-unprovisioning pre-destroy">
<properties>
<property name="drop-schemas" value="true"/>
</properties>
</phase>
</association-rule>
<association-rule name="WEBTIER_DEPENDENCY">
<selection-criteria>
<family>Webtier</family>
</selection-criteria>
<phase name="p1" values="pre-provisioning"/>
<phase name="p2" values="maintenance-start"/>
<phase name="p3" values="maintenance-end"/>
<phase name="p4" values="scale-up"/>
<phase name="p5" values="scale-down"/>
<phase name="p6" values="post-provisioning"/>
<phase name="p7" values="pre-unprovisioning"/>
</association-rule>
<association-rule name="OPSS_DB_DEPENDENCY">
<selection-criteria>
<family>Database</family>
</selection-criteria>
<phase name="p1" values="pre-provisioning">
<properties>
<property name="schema-name.1" value="OPSS"/>
<property name="dedicated.1" value="false"/>
<property name="schema-prefix.1" value="DEV"/>
<property name="schema-password.1" value="Oracle123"/>
<property name="schema-type" value="RCU"/>
</properties>
</phase>
<phase name="p2" values="post-unprovisioning">
<properties>
<property name="drop-schemas" value="true"/>
</properties>
</phase>
</association-rule>
</association-rules>
Command list-sdp-association-rules executed successfully.
```

21. The list-sdp-properties command lists the properties of the given sdp:

```
cadmin list-sdp-properties Java-Service
Java-Service [SDPRevision : base] :
Property base-install-dir is a required STRING with default value
/tmp/wls/myinstalls Description:
Full name: service-definition.properties.property.base-install-dir Property
wls-java-home is an optional STRING with default value null
Description:
Full name: service-definition.properties.property.wls-java-home
Property node-mgr-poll-time-in-sec is an optional STRING with default
value 10
Description:
Full name:
service-definition.properties.property.node-mgr-poll-time-in-sec
.....
.....
Property scaleFactor is a required STRING with default value INFO
Description:
Full name:
service-definition.quality-of-service.service-elastic-service.action-types.ac
tion-type.scaleDown.properties.property
Command list-sdp-properties executed successfully.
```

22. With the help of the above three commands, the cadmin can customize the association-rule-properties and can also specify the associationName and associationRuleName(in case of list-service-resources command --long option lists the properties and can be used to verify that the customised properties are reflected:

```
cadmin associate-service --tenant t --associationname
SERVICE_DATABASE_DEPENDENCY
--associationRuleName SERVICE_DATABASE_DEPENDEN
Command associate-service executed successfully.
```

23. The service-resources created can be stopped and started using the stop-service-resource and start-service-resource commands:

```
cadmin stop-service-resource --tenant t oracle-service-resource
10%: stop-service-resource.Stopping service-resource
[oracle-service-resource].stop service-resource: Verifying if
[oracle-ser 21%:
stop-service-resource.Stopping service-resource
[oracle-service-resource].stop
service-resource: Getting [oracle-service- 42%:
stop-service-resource.Stopping
service-resource [oracle-service-resource].stop service-resource: Stopping
service-resourc
57%: stop-service-resource.Stopping service-resource
[oracle-service-resource].stop service-resource.oracle-service-resource:
73%:
stop-service-resource.Stopping service-resource
[oracle-service-resource].stop
service-resource.oracle-service-resource: 83%:
stop-service-resource.Stopping
service-resource [oracle-service-resource].stop service-resource: Updating
[oracle-service 100%: stop-service-resource: Service-resource stopped
Command stop-service-resource executed successfully.
cadmin start-service-resource --tenant t oracle-service-resource
10%: start-service-resource.Starting service-resource
[oracle-service-resource].start service-resource: Verifying if [oracle-s 21%:
start-service-resource.Starting service-resource
[oracle-service-resource].start service-resource: Getting [oracle-servic
42%:
start-service-resource.Starting service-resource
[oracle-service-resource].start service-resource: Starting service-resou
63%:
start-service-resource.Starting service-resource
[oracle-service-resource].start service-resource.oracle-service-resource
83%:
start-service-resource.Starting service-resource
[oracle-service-resource].start service-resource.oracle-service-resource
100%:
start-service-resource: Service-resource started
Command start-service-resource executed successfully.
```

24. The service-resource can be deleted using the terminate-service-resource command:

```
cadmin terminate-service-resource --tenant t oracle-service-resource
Command
terminate-service-resource executed successfully.
cadmin list-service-resources --tenant t Nothing to list.
Command list-service-resources executed successfully
```

25. The service-resource-type can also be deleted using the delete-service-resource-type command:

```
padmin delete-service-resource-type oracle-service-resource-type
Command
delete-service-resource-type executed successfully
padmin list-service-resource-types
Command list-service-resource-types executed successfully.
```

26. The service can be deleted using the terminate-service command:

```
cadmin terminate-service --tenant t my-java-service Command
terminate-service executed successfully.
```

27. The provider and service-resource dependencies are specified under dependencies section and associations section respectively in service-definition.xml file for any service sdp:

```
<dependencies>
<dependency name="Database" optional="true">
<association-rule-ref name="PriorityDatabase1" priority="1">
</association-rule-ref>
<association-rule-ref name="PriorityDatabase2" priority="2">
</association-rule-ref>
<association-rule-ref name="Database" priority="3">
</association-rule-ref>
</dependency>
</dependencies>
<associations>
<association name="application-database ">
<association-rule-ref name="PriorityDatabase1" priority="1">
</association-rule-ref>
<association-rule-ref name="PriorityDatabase2" priority="2">
</association-rule-ref>
<association-rule-ref name="Database" priority="3">
</association-rule-ref>
</association>
</associations>
```

The specific rules of association are referenced via association-rule-refs which are defined separately under association-rules.

```
<association-rules>
<association-rule name="PriorityDatabase1">
<selection-criteria>
<family>Database</family>
</selection-criteria>
<phase name="p1" values="post-provisioning">
</phase>
</association-rule>
<association-rule name="PriorityDatabase2">
<selection-criteria>
<family>Database</family>
</selection-criteria>
<phase name="p1" values="post-provisioning">
<properties>
</properties>
</phase>
</association-rule>
</association-rules>
```

In accordance with an embodiment, the specific rules of association referenced above via the association-rule-ref's can be defined separately under association-rules. For any given dependency or association, there can be multiple association-rule-ref's that can be defined and any one of the rules can be selected during runtime.

In accordance with an embodiment, in order to make the selection of an association rule easy, an attribute called "priority" can be defined for the "association-rule-ref", where the priority attribute can be used to specify a particular rule as a higher priority. An orchestration engine can examine all the available association rules specified in the service-definition xml file and consider the priority if specified, and select the appropriate association rule to be used during association of a provider or a service resource with a service.

In accordance with an embodiment, if more than one rule has the same priority or no-priority is defined, then an appropriate rule can be selected in a round-robin fashion. The selection of association rules for a provider occurs when a service is created; and for a service resource, the selection occurs when the service resource is being associated with the service.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing service resources to support a service in a cloud computing environment, comprising:
   one or more computers including a cloud environment executing thereon;
   a cloud platform component provided as an installable software suite within the cloud environment, wherein the cloud platform component includes a first definition package for defining a service, and a second definition package for defining a provider to support the service;
   a service resource type in the cloud platform, wherein the service resource type is derived from the second definition package;
   wherein when the service is provisioned, the service resource type is configured to be associated with the service, and in response to associating the service resource type and the service, a service resource is created using the service resource type for use by one or more user applications deployed to the service.

2. The system of claim 1, wherein the second definition package includes a plurality of feature sets, each feature set associated with a different set of configurable properties, wherein a feature set is selected to create the service resource type.

3. The system of claim 2, whereupon a selection of the feature set, a definition package manager is invoked to validate configurable properties associated with the selected feature set.

4. The system of claim 1, wherein the first definition package includes a plurality of association rules, wherein the plurality of association rules define actions to be taken on a runtime of a provider of the service resource by a provider service management engine (SME).

5. The system of claim 4, wherein the first definition package accommodates the plurality of association rules in such a way that the association rules are referenceable as a separate entity from a command.

6. The system of claim 5, wherein the plurality of association rules are used by the provider SME to create the provider and the service resource.

7. A method for providing service resources to support a service in a cloud computing environment, comprising:
   providing, at one or more computers including a cloud environment executing thereon, a cloud platform component as an installable software suite that component includes a first definition package for defining a service, and a second definition package for defining a provider to support the service; and
   providing a service resource type in the cloud platform, wherein the service resource type is derived from the second definition package; associating the service resource type with the service when the service is provision; and
   creating, in response to associating the service resource type and the service, a service resource using the service resource type, for use by one or more user applications deployed to the service.

8. The method of claim 7, wherein the second definition package includes a plurality of feature sets, each feature set associated with a different set of configurable properties, wherein a feature set is selected to create the service resource type.

9. The method of claim 8, whereupon a selection of the feature set, a definition package manager is invoked to validate configurable properties associated with the selected feature set.

10. The method of claim 7, wherein the first definition package includes a plurality of association rules, wherein the plurality of association rules define actions to be taken on a runtime of a provider of the service resource by a provider service management engine (SME).

11. The method of claim 10, wherein the first definition package accommodates the plurality of association rules in such a way that the association rules are referenceable as a separate entity from a command.

12. The method of claim 11, wherein the plurality of association rules are used by a provider SME to create the provider and the service resource.

13. A non-transitory computer readable storage medium, including instructions stored thereon which when read and executed by one or more computers cause the one or more computers to perform the steps comprising:
   configuring, at one or more computers including a cloud environment executing thereon, a cloud platform component as an installable software suite that component includes a first definition package for defining a service, and a second definition package for defining a provider to support the service; and
   providing a service resource type in the cloud platform, wherein the service resource type is derived from the second definition package; associating the service resource type with the service when the service is provision; and creating, in response to associating the service resource type and the service, a service resource using the service resource type, for use by one or more user applications deployed to the service.

14. The non-transitory computer readable storage medium of claim 13, wherein the second definition package includes a plurality of feature sets, each feature set associated with a different set of configurable properties, wherein a feature set is selected to create the service resource type.

15. The non-transitory computer readable storage medium of claim 14, whereupon a selection of the feature set, a definition package manager is invoked to validate configurable properties associated with the selected feature set.

16. The non-transitory computer readable storage medium of claim 13, wherein the first definition package includes a plurality of association rules, wherein the plurality of association rules define actions to be taken on a runtime of a provider of the service resource by a provider service management engine (SME).

17. The non-transitory computer readable storage medium of claim 16, wherein the first definition package accommodates the plurality of association rules in such a way that the association rules are referenceable as a separate entity from a command.

18. The non-transitory computer readable storage medium of claim 17, wherein the plurality of association rules are used by a provider SME to create the provider and the service resource.

* * * * *

UNITED STATES PATENT AND TRADEMARK OFFICE
CERTIFICATE OF CORRECTION

PATENT NO. : 9,742,688 B2  
APPLICATION NO. : 14/495822  
DATED : August 22, 2017  
INVENTOR(S) : Islam et al.

Page 1 of 1

It is certified that error appears in the above-identified patent and that said Letters Patent is hereby corrected as shown below:

In the Specification

In Column 2, Line 27, after "embodiment" insert -- . --.

In Column 2, Line 30, after "embodiment" insert -- . --.

In Column 2, Line 34, after "embodiment" insert -- . --.

In Column 14, Line 20, delete ""dissassociation">" and insert -- "disassociation"> --, therefor.

In Column 15, Line 9, delete "unprovising" and insert -- unprovisioning --, therefor.

In Column 22, Line 19, delete "-db resource-" and insert -- -db-resource- --, therefor.

Signed and Sealed this  
Twenty-ninth Day of May, 2018

Andrei Iancu  
*Director of the United States Patent and Trademark Office*